(12) United States Patent
Davydov

(10) Patent No.: US 9,732,290 B2
(45) Date of Patent: Aug. 15, 2017

(54) PROCESS AND APPARATUS FOR CRACKING HYDROCARBONS WITH RECYCLED CATALYST TO PRODUCE ADDITIONAL DISTILLATE

(71) Applicant: UOP LLC, Des Plaines, IL (US)

(72) Inventor: Lev Davydov, Northbrook, IL (US)

(73) Assignee: UOP LLC, Des Plaines, IL (US)

( * ) Notice: Subject to any disclaimer, the term of this patent is extended or adjusted under 35 U.S.C. 154(b) by 32 days.

(21) Appl. No.: 14/642,985

(22) Filed: Mar. 10, 2015

(65) Prior Publication Data

US 2016/0263544 A1 Sep. 15, 2016

(51) Int. Cl.
*C10G 69/04* (2006.01)
*B01J 8/04* (2006.01)
*B01J 8/18* (2006.01)

(52) U.S. Cl.
CPC ............ *C10G 69/04* (2013.01); *B01J 8/0453* (2013.01); *B01J 8/1845* (2013.01); *B01J 2219/00006* (2013.01)

(58) Field of Classification Search
CPC . C10G 69/04; B01J 8/18; B01J 8/1845; B01J 8/04; B01J 8/0453
See application file for complete search history.

(56) References Cited

U.S. PATENT DOCUMENTS

| | | |
|---|---|---|
| 3,748,251 A | 7/1973 | Demmel et al. |
| 3,891,538 A | 6/1975 | Walkey |
| 4,426,276 A | 1/1984 | Dean et al. |
| 4,436,613 A | 3/1984 | Sayles et al. |
| 4,604,185 A | 8/1986 | McConaghy, Jr. et al. |
| 5,059,301 A | 10/1991 | Roussel et al. |
| 5,076,910 A | 12/1991 | Rush |
| 5,080,777 A | 1/1992 | Aegerter, Jr. et al. |
| 5,360,533 A | 11/1994 | Tagamolila et al. |
| 5,451,313 A * | 9/1995 | Wegerer ................ C10G 11/18 208/113 |
| 5,685,972 A | 11/1997 | Timken et al. |
| 7,220,351 B1 | 5/2007 | Pontier et al. |
| 7,265,252 B1 | 9/2007 | Frey et al. |
| 7,470,357 B1 | 12/2008 | Hoehn et al. |
| 7,611,622 B2 | 11/2009 | Niccum et al. |
| 7,682,500 B2 | 3/2010 | Kalnes |

(Continued)

FOREIGN PATENT DOCUMENTS

EP 1050572 A2 11/2000

OTHER PUBLICATIONS

Mandal, "Effect of Coke on Catalysts in Distillate FCC Unit Performance", Ind. Eng. Chem. Res., 1993, 32, 1018-1023.

(Continued)

*Primary Examiner* — Lessanework Seifu
(74) *Attorney, Agent, or Firm* — James C. Paschall

(57) ABSTRACT

A process and apparatus is for recycling LCO and/or HCO to an FCC unit to recover additional distillate. Spent catalyst recycle in the FCC unit may be used to improve distillate yield. A hydroprocessing zone may saturate cycle oil aromatics for cracking in an FCC unit. The recycle cracked stream may be recycled to a downstream hydroprocessing zone to avoid a first hydroprocessing zone for hydrotreating feed to the FCC unit. Additional recovery of cycle oil for recycle is obtained by heating slurry oil prior to vacuum separation.

19 Claims, 2 Drawing Sheets

(56) References Cited

U.S. PATENT DOCUMENTS

| | | | |
|---|---|---|---|
| 7,837,860 | B1 | 11/2010 | Hoehn et al. |
| 8,529,753 | B2 | 9/2013 | Niu et al. |
| 8,864,979 | B2 | 10/2014 | Palmas |
| 8,894,840 | B2 | 11/2014 | Leonard et al. |
| 2001/0031227 | A1 | 10/2001 | Lomas |
| 2009/0127161 | A1 | 5/2009 | Haizmann et al. |
| 2009/0129998 | A1 | 5/2009 | Haizmann et al. |
| 2009/0288985 | A1 | 11/2009 | Long et al. |
| 2011/0005972 | A1 | 1/2011 | Kim et al. |
| 2011/0207979 | A1 | 8/2011 | Kim et al. |
| 2013/0001130 | A1 | 1/2013 | Mo |
| 2013/0048537 | A1 | 2/2013 | Noh et al. |
| 2013/0062250 | A1 | 3/2013 | Gao et al. |
| 2013/0343956 | A1 | 12/2013 | Al-Thubaiti et al. |

OTHER PUBLICATIONS

U.S. Appl. No. 14/248,923, filed Apr. 9, 2014.
U.S. Appl. No. 14/248,945, filed Apr. 9, 2014.
U.S. Appl. No. 14/248,985, filed Apr. 9, 2014.
U.S. Appl. No. 14/249,007, filed Apr. 9, 2014.
U.S. Appl. No. 14/642,962, filed Mar. 10, 2015.
U.S. Appl. No. 14/642,972, filed Mar. 10, 2015.
U.S. Appl. No. 14/642,977, filed Mar. 10, 2015.
U.S. Appl. No. 14/642,986, filed Mar. 10, 2015.
U.S. Appl. No. 14/642,990, filed Mar. 10, 2015.
U.S. Appl. No. 14/248,904, filed Apr. 9, 2014.
Search Report dated Jun. 16, 2015 for corresponding PCT Appl. No. PCT/US2015/022914.
Search Report dated Jun. 29, 2015 for corresponding PCT Appl. No. PCT/US2015/024860.

\* cited by examiner

PROCESS AND APPARATUS FOR CRACKING HYDROCARBONS WITH RECYCLED CATALYST TO PRODUCE ADDITIONAL DISTILLATE

BACKGROUND OF THE INVENTION

The field of the invention is fluid catalytic cracking (FCC).

FCC technology, now more than 50 years old, has undergone continuous improvement and remains the predominant source of gasoline production in many refineries. This gasoline, as well as lighter products, is formed as the result of cracking heavier, less valuable hydrocarbon feed stocks such as gas oil.

In its most general form, the FCC process comprises a reactor that is closely coupled with a regenerator, followed by downstream hydrocarbon product separation. Hydrocarbon feed contacts catalyst in the reactor to crack the hydrocarbons down to smaller molecular weight products. During this process, coke tends to accumulate on the catalyst which is burned off in the regenerator.

It has been recognized that due to environmental concerns and newly enacted rules and regulations, saleable petroleum products must meet lower and lower limits on contaminates, such as sulfur and nitrogen. New regulations require essentially complete removal of sulfur from liquid hydrocarbons that are used in transportation fuels, such as gasoline and diesel.

The least valuable product from an FCC process is slurry oil which is withdrawn from the bottom of the FCC main fractionation column and burned as fuel. The slurry oil comprises the heaviest product mixed with catalyst particles that have not been successfully removed from the FCC products. LCO is also produced in an FCC unit and can be directed to the diesel pool. However, LCO may degrade the quality of the diesel pool due to its high aromaticity and low cetane value. The slurry oil is less valuable than LCO. Due to operational constraints of the FCC main fractionation column, the slurry oil leaves the main fractionator with an appreciable amount of hydrocarbons in the boiling range of LCO and a small amount in the boiling range of gasoline. Heavy cycle oil (HCO) is an FCC liquid stream pumped around to cool the main fractionation column but is not often recovered from the main fractionation column.

Hydroprocessing is a process that contacts a selected feedstock and hydrogen-containing gas with suitable catalyst(s) in a reaction vessel under conditions of elevated temperature and pressure. Hydrotreating is a hydroprocessing process in which heteroatoms such as sulfur and nitrogen are removed from hydrocarbon streams to meet fuel specifications and to saturate olefinic and aromatic compounds. Hydroprocessing is also used to prepare fresh hydrocarbon feed for FCC processing by demetallizing the FCC feed. Metals, vanadium and nickel, in the FCC feed can deactivate the FCC catalyst during the FCC process.

The demand for diesel has increased over gasoline in recent years. Increased recovery of LCO produced in an FCC unit can be directed to the diesel pool and augment diesel production. Further conversion of the HCO to LCO and other motor fuel products would also be desirable.

SUMMARY OF THE INVENTION

We have discovered a process and apparatus for contacting feed in an FCC unit with a higher proportion of spent catalyst to obtain higher selectivity to LCO product that can be taken as diesel product.

In a process embodiment, the invention comprises a process for catalytically cracking hydrocarbons comprising feeding a fresh hydrocarbon feed stream to a hydroprocessing zone to hydroprocess the hydrocarbon feed stream to provide a hydroprocessed effluent stream. Hydroprocessed products are separated from the hydroprocessed effluent stream to provide an FCC feed stream. The FCC feed stream is fed to an FCC reactor and the FCC feed stream is contacted with catalyst to catalytically crack the FCC feed stream to provide a cracked stream. The catalyst is disengaged from the cracked stream. A first portion of the catalyst disengaged from the cracked stream is regenerated and a second portion of the catalyst disengaged from the cracked stream is recycled to be contacted with the FCC feed stream without undergoing regeneration. The second portion of catalyst has about 0.7 to about 1.1 wt % coke on catalyst.

In an apparatus embodiment, the invention comprises an apparatus for catalytically cracking hydrocarbons comprising a hydroprocessing unit to hydroprocess a hydrocarbon feed stream to provide a hydroprocessed effluent stream. A hydroprocessing separation section is in downstream communication with the hydroprocessing unit for separating hydroprocessed products to provide an FCC feed stream. An FCC reactor is in downstream communication with the hydroprocessing separation section for contacting the FCC feed stream with catalyst in a riser to catalytically crack the FCC feed stream to provide a cracked stream and spent catalyst. A regenerator is in downstream communication with the riser outlet for regenerating the spent catalyst and a recycle conduit in downstream communication with the riser outlet for recycling the spent catalyst to the FCC riser.

Advantageously, the process and apparatus can enable the FCC unit to product more LCO which can augment the diesel product recovery of the unit.

Additional features and advantages of the invention will be apparent from the description of the invention, figure and claims provided herein.

DEFINITIONS

Figure 1:
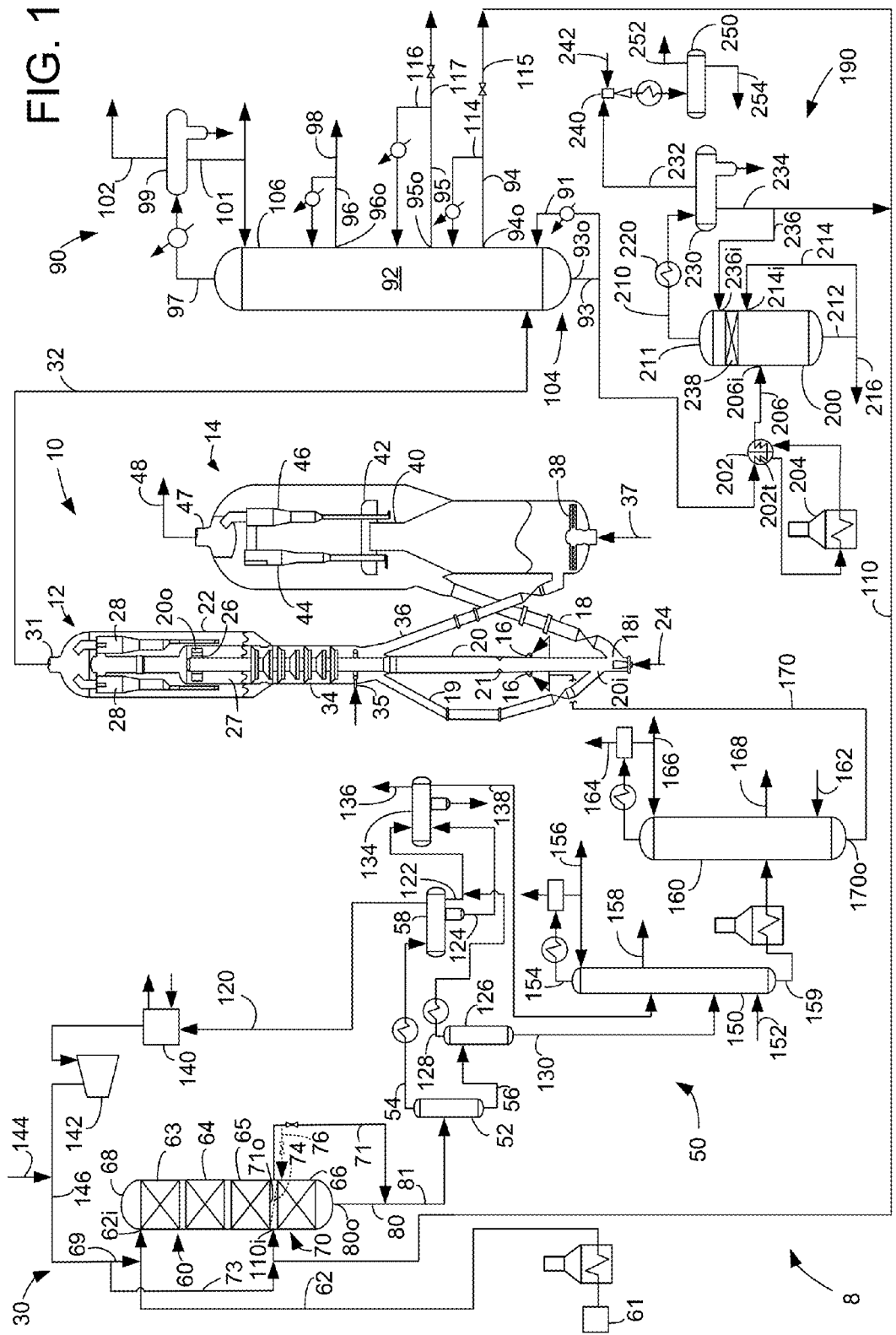
FIG. 1 is a schematic drawing of an FCC unit.

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "direct communication" means that flow from the upstream component enters the downstream component without undergoing a compositional change due to physical fractionation or chemical conversion.

The term "bypass" means that the object is out of downstream communication with a bypassing subject at least to the extent of bypassing.

The term "column" means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottoms stream back to the bottom of the column. Feeds to the columns may be preheated. The top pressure is the pressure of the overhead vapor at the vapor outlet of the column. The bottom temperature is the liquid bottom outlet temperature. Overhead lines and bottoms lines refer to the net lines from the column downstream of any reflux or reboil to the column. Stripping columns omit a reboiler at a bottom of the column and instead provide heating requirements and separation impetus from a fluidized inert media such as steam.

As used herein, the term "True Boiling Point" (TBP) or "TBP method" means a test method for determining the boiling point of a material which corresponds to ASTM D-2892 for the production of a liquefied gas, distillate fractions, and residuum of standardized quality on which analytical data can be obtained, and the determination of yields of the above fractions by both mass and volume from which a graph of temperature versus mass % distilled is produced using fifteen theoretical plates in a column with a 5:1 reflux ratio.

As used herein, the term "T5" or "T95" means the temperature at which 5 volume percent or 95 volume percent, as the case may be, respectively, of the sample boils using ASTM D-86.

As used herein, the term "initial boiling point" (IBP) means the temperature at which the sample begins to boil using ASTM D-86.

As used herein, the term "end point" (EP) means the temperature at which the sample has all boiled off using ASTM D-86.

As used herein, the term "diesel cut point" is between about 343° C. (650° F.) and about 399° C. (750° F.) using the TBP method.

As used herein, the term "diesel boiling range" means hydrocarbons boiling in the range of between about 132° C. (270° F.) and the diesel cut point using the TBP method.

As used herein, the term "diesel conversion" means conversion of feed that boils above the diesel cut point to material that boils at or below the diesel cut point in the diesel boiling range.

As used herein, the term "separator" means a vessel which has an inlet and at least an overhead vapor outlet and a bottoms liquid outlet and may also have an aqueous stream outlet from a boot. A flash drum is a type of separator which may be in downstream communication with a separator that may be operated at higher pressure.

As used herein, the term "predominant" or "predominate" means greater than 50%, suitably greater than 75% and preferably greater than 90%.

DETAILED DESCRIPTION

FIG. 1, wherein like numerals designate like components, illustrates an apparatus and process 8 that is equipped for processing a fresh hydrocarbon feed stream. The apparatus and process 8 generally include an FCC unit 10, a hydroprocessing unit 30, a hydroprocessing separation section 50, an FCC recovery section 90 and a vacuum recovery section 190.

The FCC unit 10 includes an FCC reactor 12 comprising a riser 20 and a catalyst regenerator 14. The fresh hydrocarbon feed stream may first be processed in the hydroprocessing unit 30. A conventional FCC feedstock and higher boiling hydrocarbon feedstock are suitable fresh hydrocarbon feed streams. The most common of such conventional fresh hydrocarbon feedstocks is a "vacuum gas oil" (VGO), which is typically a hydrocarbon material having a boiling range with an IBP of at least about 232° C. (450° F.), a T5 of at least about 288° C. (550° F.) to about 343° C. (650° F.), a T95 between about 510° C. (950° F.) and about 570° C. (1058° F.) and an EP of no more than about 626° C. (1158° F.) prepared by vacuum fractionation of atmospheric residue. Such a fraction is generally low in coke precursors and heavy metal contamination which can serve to contaminate catalyst. Atmospheric residue is a preferred feedstock boiling with an IBP of at least about 315° C. (600° F.), a T5 between about 340° C. (644° F.) and about 360° C. (680° F.) and a T95 of between about 700° C. (1292° F.) and about 900° C. (1652° F.) obtained from the bottoms of an atmospheric crude distillation column. Atmospheric residue is generally high in coke precursors and metal contamination. Other heavy hydrocarbon feedstocks which may serve as fresh hydrocarbon feed include heavy bottoms from crude oil, heavy bitumen crude oil, shale oil, tar sand extract, deasphalted residue, products from coal liquefaction, and vacuum reduced crudes. Fresh hydrocarbon feedstocks also include mixtures of the above hydrocarbons and the foregoing list is not exhaustive.

Upstream of the FCC unit 10, a fresh hydrocarbon feed stream is hydroprocessed in a hydroprocessing unit 30. The hydroprocessing unit 30 may comprise a first hydroprocessing zone 60 and a second hydroprocessing zone 70. In the hydroprocessing unit 30, four hydroprocessing sections 63, 64, 65 and 66 are shown. More or less hydroprocessing sections may be used, and each hydroprocessing zone 60, 70 may comprise a part or one or more hydroprocessing sections. Each hydroprocessing section 63-66 may comprise part of or one or more catalyst beds. In an embodiment, each hydroprocessing section 63-66 comprises a catalyst bed. Each hydroprocessing section 63-66 may be one of a demetallization section, a denitrification section, a desulfurization section and an aromatic saturation section.

The fresh hydrocarbon feed stream in a fresh feed line 62 may be mixed with hydrogen from hydrogen line 69 and the mixed fresh hydrocarbon feed stream be fed to the first hydroprocessing zone 60 through a first inlet 62i of the hydroprocessing unit 30. The first inlet 62i is in downstream communication with a source of the fresh hydrocarbon feed stream such as a fresh feed tank 61. Water may be added to the fresh feed in line 62. The fresh feed may also be heated in a fired heater before entering the first hydroprocessing zone 60. The first hydroprocessing zone 60 may be a hydroprocessing catalyst bed in a hydroprocessing reactor vessel 68 or it may be a hydroprocessing reactor vessel 68 comprising one or more hydroprocessing catalyst beds. In FIG. 1, the first hydroprocessing zone 60 may comprise three hydroprocessing sections 63, 64 and 65 comprising three beds of hydroprocessing catalyst in a hydroprocessing reactor vessel 68.

Suitable hydroprocessing catalysts for use in the hydroprocessing sections 63, 64 and 65 are any known conventional hydrotreating catalysts and include those which are comprised of at least one Group VIII metal, preferably iron, cobalt and nickel, more preferably nickel and/or cobalt and at least one Group VI metal, preferably molybdenum and tungsten, on a high surface area support material, preferably alumina. It is within the scope of the present invention that more than one type of hydrotreating catalyst be used in the same reaction vessel or catalyst bed. The Group VIII metal is typically present in an amount ranging from about 1 to about 10 wt %, preferably from about 2 to about 5 wt %. The Group VI metal will typically be present in an amount ranging from about 1 to about 20 wt %, preferably from about 2 to about 10 wt %.

Any of the hydroprocessing sections 63-66 may be a demetallization section, a denitrogenation section, a desulfurization section or an aromatic saturation section. The first hydroprocessing zone 60 may include the first hydroprocessing section 63. In an embodiment, the first hydroprocessing section 63 may comprise a demetallization section that may include a hydrodemetallization catalyst comprising cobalt and molybdenum on gamma alumina. When the first hydroprocessing section 63 is a demetallization section it is intended to demetallize the fresh hydrocarbon feed stream, so to reduce the metals concentration in the fresh feed stream by about 55 to about 100 wt % and typically about 65 to about 95 wt % to produce a first demetallized effluent stream exiting the demetallization, first hydroprocessing section 63. The metal content of the demetallized effluent stream may be less than about 200 wppm and preferably between about 5 and about 75 wppm. The first hydroprocessing zone 60 may also denitrogenate and/or desulfurize the fresh hydrocarbon stream in fresh feed line 62. In this embodiment, the demetallized effluent stream may exit the first hydroprocessing section 63 and enter the second hydroprocessing section 64.

The first hydroprocessing zone 60 may include the second hydroprocessing section 64. In an embodiment, the second hydroprocessing section 64 may comprise a denitrogenation section that may include a hydrodenitrogenation catalyst which may comprise nickel and molybdenum on gamma alumina to convert organic nitrogen to ammonia. The denitrogenation section reduces the nitrogen concentration in the fresh feed stream by about 55 to about 100 wt % and typically about 65 to about 95 wt % to produce a denitrogenated effluent stream exiting the denitrogenation section. In this embodiment, the denitrogenated effluent stream may exit the second hydroprocessing section 64 and enter the third hydroprocessing section 65.

The first hydroprocessing zone 60 may include the third hydroprocessing section 65. In an embodiment the third hydroprocessing section may comprise a desulfurization section comprising a hydrodesulfurization catalyst which may comprise cobalt and molybdenum on gamma alumina to convert organic sulfur to hydrogen sulfide. The hydrodesulfurization catalyst may also be able to saturate aromatics to naphthenes. The desulfurization section reduces the sulfur concentration in the fresh feed stream by about 55 to about 100 wt % and typically about 65 to about 95 wt % to produce a desulfurized effluent stream exiting the desulfurization section 65. In this embodiment, the desulfurized effluent may exit the third hydroprocessing section 65.

It is contemplated that the first hydroprocessing zone 60 comprise one, two or all of the hydroprocessing sections 62, 63 and 64 to optionally demetallize and denitrogenate the fresh feed stream and optionally, demetallize, denitrogenate and desulfurize the fresh feed stream in fresh feed line 62. Preferably, the first hydroprocessing zone 60 comprises the hydroprocessing sections 62, 63 and 64 to demetallize, denitrogenate and desulfurize the fresh feed stream 62.

The first hydroprocessed effluent may leave the first hydroprocessing zone 60 through outlet 71o. The outlet 71o from the first hydroprocessing zone 60 may be the outlet in the bottom of the last hydroprocessing section 63, 64 or 65. In FIG. 1, the outlet 71o is in the last hydroprocessing section 65 in the first hydroprocessing zone 60. A portion of the first hydroprocessed effluent in a first effluent line 71 may be fed to the riser 20 of the FCC reactor 12 to be contacted with catalyst and provide a cracked stream, so the riser 20 and the FCC reactor 12 may be in downstream communication with the first outlet 71o. In such an embodiment, the first hydroprocessed effluent would be transported to the hydroprocessing separation section 50, in an aspect to a hot separator 52, so that a portion of the first hydroprocessed effluent would be directed to the FCC reactor 12 while bypassing a second hydroprocessing zone 70. In such an embodiment, the first effluent line 71 transports the first hydroprocessing effluent stream to a hydroprocessing recovery feed line 81 regulated by a control valve on the first effluent line 71. Accordingly, when the control valve on the first effluent line 71 is open, at least a portion of the first hydroprocessing effluent stream in line 71 bypasses the second hydroprocessing zone 70 and enters into the hydroprocessing recovery zone 50. In such an embodiment, the second hydroprocessing zone 70 is out of downstream communication with the first outlet 71o of the first hydroprocessing zone 60.

An imperforate barrier 74 shown in phantom may optionally be installed between the first hydroprocessing zone 60 and the second hydroprocessing zone 70 to prevent the first hydroprocessing effluent from mixing with the recycle cracked stream in line 110. The imperforate barrier 74 may isolate the first outlet 71o from the second inlet 110i.

In another embodiment of FIG. 1, at least a portion of the first hydroprocessed effluent stream is fed to the second hydroprocessing zone 70, so the second hydroprocessing zone 70 is in downstream communication with the first outlet 71o of the first hydroprocessing zone 60. In such an embodiment, the control valve on the first effluent line 71 is at least partially closed, and at least a portion or all of the first hydroprocessed effluent stream may pass from the first hydroprocessing zone 60 to the second hydroprocessing zone 70. As shown in FIG. 1, the first hydroprocessed effluent passes from the third hydroprocessing section 65 in the first hydroprocessing zone 60 to the fourth hydroprocessing section 66 in the second hydroprocessing zone 70 when the imperforate barrier 74 is not used. If an imperforate barrier 74 is used, at least a portion or all of the first hydroprocessed effluent may pass from the first hydroprocessing zone 60 to the second hydroprocessing zone 70 through an optional return line 76 shown in phantom with a control valve thereon shown in phantom open and the control valve on the first effluent line 71 at least partially closed.

A recycle cracked stream to be described hereinafter in a recycle line 110 may be fed to the hydroprocessing unit 30. In an embodiment, the recycle cracked stream may be fed to the second hydroprocessing zone 70 through a second inlet 110i. In an embodiment, at least a portion of the first hydroprocessed effluent stream from the first hydroprocessing zone may also be fed to the second hydroprocessing zone 70 with the recycle cracked stream. As shown in FIG. 1, the recycle cracked stream passes to the fourth hydroprocessing section 66 in the second hydroprocessing zone 70 through the second inlet 110i. It is contemplated that gases such as hydrogen sulfide and ammonia may be removed from the first hydroprocessed effluent stream before entering the second hydroprocessing zone 70, but this may not be necessary.

The recycle cracked stream may be mixed with hydrogen from an optional hydrogen line 73 and the mixed recycle cracked stream may be fed to the second hydroprocessing zone 70 through the second inlet 110i. Sufficient hydrogen may be present in the first hydroprocessed effluent to make the optional hydrogen line 73 unnecessary. If gases are removed from the first hydroprocessed effluent before it is fed to the second hydroprocessing zone 70 or if the first hydroprocessed effluent is not fed to the second hydroprocessing zone 70, hydrogen will need to be added to the recycle cracked stream in line 73.

The second hydroprocessing zone 70 may include the fourth hydroprocessing section 66. In an embodiment, the fourth hydroprocessing section 66 may comprise an aromatic saturation catalyst. The aromatic saturation catalyst may comprise nickel and tungsten on gamma alumina. The second hydroprocessing zone 70 may also comprise an additional hydroprocessing section to desulfurize the recycle cracked stream and optionally at least a portion of the first hydroprocessed effluent stream upstream of the hydroprocessing section 66, but this is not shown.

The second hydroprocessing zone 70 may be a part of or one or more hydroprocessing catalyst beds in a hydroprocessing reactor vessel 68 or it may be an additional hydroprocessing reactor vessel comprising one or more hydroprocessing catalyst beds. In FIG. 1, the second hydroprocessing zone 70 is in the hydroprocessing reactor vessel 68 which contains all four hydroprocessing sections 63, 64, 65, 66 comprising beds of hydroprocessing catalyst. It is also contemplated that the first hydroprocessing zone 60 and the second hydroprocessing zone 70 be contained in the same reactor vessel 68 or in different vessels.

Suitable aromatic saturation catalysts for use in the aromatic saturation section in the second hydroprocessing zone 70 may be any known conventional hydrotreating catalysts and include those which are comprised of at least one Group VIII metal, preferably iron, cobalt and nickel, more preferably nickel and/or cobalt and at least one Group VI metal, preferably molybdenum and tungsten, on a support material which may have a surface area ranging between about 120 and about 270 m$^2$/g, preferably alumina. Other suitable aromatic saturation catalysts include noble metal catalysts where the noble metal is selected from palladium and platinum and unsupported multi-metallic catalysts. If a noble metal catalyst is used, hydrogen sulfide and ammonia gases will most likely have to be removed from the first hydroprocessed effluent before it is fed to the aromatic saturation section or only the recycle cracked stream can be fed to the fourth hydroprocessing section. More than one type of hydrotreating catalyst may be used in the same reaction vessel or catalyst bed. The Group VIII metal is typically present in the catalyst in an amount ranging from about 1 to about 10 wt %, preferably from about 2 to about 5 wt %. The Group VI metal will typically be present in the catalyst in an amount ranging from about 1 to about 20 wt %, preferably from about 2 to about 10 wt %.

About 75 to about 95 wt % of the hydroprocessing catalyst in the hydroprocessing unit 30 including the first hydroprocessing zone 60 and the second hydroprocessing zone 70 will be in the first hydroprocessing zone 60. About 5 to about 25 wt % of the hydroprocessing catalyst in the hydroprocessing unit 30 will be in the second hydroprocessing zone 70. The hydroprocessing catalyst in the second hydroprocessing zone 70 will be more active than the hydroprocessing catalyst in the first hydroprocessing zone 60.

The second hydroprocessing zone 70 may saturate aromatic rings in the feed to enable them to be cracked in the FCC unit 10 to make high quality diesel and gasoline while preserving a single ring to produce single ring aromatic compounds and light olefins. The second hydroprocessing zone 70 produces a second hydroprocessed effluent stream in a second effluent line 80 exiting the second hydroprocessing zone through a second outlet 80o.

The first hydroprocessing zone 60 may be loaded with a greater fraction of hydrodemetallization catalyst, typically in the hydroprocessing section 63, than the second hydroprocessing zone 70. Accordingly, more hydrodemetallization occurs in the first hydroprocessing zone 60 than in the second hydroprocessing zone 70. However, the second hydroprocessing zone 70 is loaded with a greater fraction of aromatic saturation catalyst than the first hydroprocessing zone 60, typically in the hydroprocessing section 66, so more aromatic saturation occurs in the second hydroprocessing zone 70 than in the first hydroprocessing zone 60. The first hydroprocessing zone 60 may be loaded with a greater fraction of hydrodenitrogenation catalyst, typically in the hydroprocessing section 64, than the second hydroprocessing zone 70. Accordingly, more hydrodenitrogenation occurs in the first hydroprocessing zone 60 than in the second hydroprocessing zone 70. The second hydroprocessing zone 70 may be loaded with a greater fraction of hydrodesulfurization catalyst than the first hydroprocessing zone 60, typically in the hydroprocessing section 65, so more hydrodesulfurization occurs in the second hydroprocessing zone 70 than in the first hydroprocessing zone 60.

Suitable hydroprocessing reaction conditions in the first hydroprocessing zone 60 and the second hydroprocessing zone 70 include a temperature from about 204° C. (400° F.) to about 399° C. (750° F.), suitably between about 360° C. (680° F.) to about 382° C. (720° F.) and preferably between about 366° C. (690° F.) to about 377° C. (710° F.), a pressure from about 3.5 MPa (500 psig), preferably 6.9 MPa (1000 psig), to about 20.7 MPa (gauge) (3000 psig) and preferably no more than 17.9 MPa (gauge) (2600 psig) in both the first hydroprocessing zone 60 and the second hydroprocessing zone 70, a liquid hourly space velocity of the fresh hydrocarbonaceous feedstock from about 0.1 hr$^{-1}$ to about 10 hr$^{-1}$ in each hydroprocessing zone. The conditions in the second hydroprocessing zone 70 are set to be less severe so as to predominantly hydrotreat, specifically saturate aromatic rings, instead of hydrocracking aromatic rings in the second hydroprocessing zone 70. It is preferred to crack aromatic rings in the FCC unit 10 to produce more olefinic products.

A hydroprocessing separation section 50 may be provided in downstream communication with the hydroprocessing unit 30, the second effluent line 80 and/or the first effluent line 71. The hydroprocessing separation section 50 separates hydroprocessed products from the second hydroprocessed effluent stream to provide to the FCC reactor 12 an FCC feed stream which constitutes a portion of the second hydroprocessed effluent stream in the second effluent line 80. If the first hydroprocessed effluent stream in the first effluent line 71 bypasses the second hydroprocessing zone 70 without undergoing hydroprocessing in the second hydroprocessing zone 70, the first hydroprocessed effluent may also enter the hydroprocessing separation section 50 with the second hydroprocessed effluent stream in a hot separator feed line 81.

The second hydroprocessed effluent stream in the hot separator feed line 81 from the second effluent line 80 may be cooled and separated in a hot separator 52. In an aspect, the first hydroprocessed effluent stream in the first effluent line 71 that bypasses the second hydroprocessing zone 70 may also enter the hot separator 52 in the hot separator feed line 81. The bypassing first hydroprocessed effluent stream and the second hydroprocessed effluent stream may enter the hot separator 52 together or separately. The hot separator 52 separates the second hydroprocessed effluent and perhaps the bypassing, first hydroprocessed effluent to provide a vaporous hydrocarbonaceous hot separator overhead stream in an overhead line 54 and a liquid hydrocarbonaceous hot separator bottoms stream in a bottoms line 56. The hot separator 52 is in direct downstream communication with the second hydroprocessing zone 70 and may be in direct downstream communication with the first hydroprocessing zone 60. The hot separator 52 operates at about 177° C. (350° F.) to about 371° C. (700° F.). The hot separator 52 may be operated at a slightly lower pressure than the second hydroprocessing zone 70 accounting for pressure drop of intervening equipment.

The vaporous hydrocarbonaceous hot separator overhead stream in the overhead line 54 may be cooled before entering a cold separator 58. To prevent deposition of ammonium bisulfide or ammonium chloride salts in the line 54 transporting the hot separator overhead stream, a suitable amount of wash water (not shown) may be introduced into line 54.

The cold separator 58 serves to separate hydrogen from hydrocarbon in the hydroprocessing effluent for recycle to the first hydroprocessing zone 60 and/or the second hydroprocessing zone 70 in lines 69 and 73, respectively. The vaporous hydrocarbonaceous hot separator overhead stream may be separated in the cold separator 58 to provide a vaporous cold separator overhead stream comprising a hydrogen-rich gas stream in an overhead line 120 and a liquid cold separator bottoms stream in the bottoms line 122. The cold separator 58, therefore, is in downstream communication with the overhead line 54 of the hot separator 52 and the second hydroprocessing zone 70. The cold separator 58 may be operated at about 100° F. (38° C.) to about 150° F. (66° C.) and just below the pressure of the second hydroprocessing zone 70 and the hot separator 52 accounting for pressure drop of intervening equipment to keep hydrogen and light gases in the overhead and normally liquid hydrocarbons in the bottoms. The cold separator 58 may also have a boot for collecting an aqueous phase in line 124.

The liquid hydrocarbonaceous stream in the hot separator bottoms line 56 may be let down in pressure and flashed in a hot flash drum 126 to provide a hot flash overhead stream of light ends in an overhead line 128 and a heavy liquid stream in a hot flash bottoms line 130. The hot flash drum 126 may be operated at the same temperature as the hot separator 52 but at a lower pressure. The heavy liquid stream in bottoms line 130 may be stripped in a hydroprocessing stripping column 150 to remove hydrogen sulfide and ammonia.

In an aspect, the liquid hydroprocessing effluent stream in the cold separator bottoms line 122 may be let down in pressure and flashed in a cold flash drum 134. The cold flash drum may be in downstream communication with a bottoms line 122 of the cold separator 58. In a further aspect, the vaporous hot flash overhead stream in overhead line 128 may be cooled and also separated in the cold flash drum 134. The cold flash drum 134 may separate the cold separator liquid bottoms stream in line 122 and hot flash vaporous overhead stream in overhead line 128 to provide a cold flash overhead stream of light ends in overhead line 136 and a cold flash bottoms stream in a bottoms line 138. The cold flash bottoms stream in bottoms line 138 may be introduced to the hydroprocessing stripping column 150. In an aspect, the hydroprocessing stripping column 150 may be in downstream communication with the cold flash bottoms line 138 and the cold flash drum 134.

The cold flash drum 134 may be in downstream communication with the bottoms line 122 of the cold separator 58, the overhead line 128 of the hot flash drum 126 and the second hydroprocessing zone 70. In an aspect, the hot flash overhead line 128 joins the cold separator bottoms line 122 which feeds the hot flash overhead stream and the cold separator bottoms stream together to the cold flash drum 134. The cold flash drum 134 may be operated at the same temperature as the cold separator 58 but typically at a lower pressure. The aqueous stream in line 124 from the boot of the cold separator may also be directed to the cold flash drum 134. A flashed aqueous stream is removed from a boot in the cold flash drum 134.

The vaporous cold separator overhead stream comprising hydrogen in the overhead line 120 is rich in hydrogen. The cold separator overhead stream in overhead line 120 may be passed through a scrubbing tower 140 to remove hydrogen sulfide and ammonia by use of an absorbent such as an amine absorbent. The scrubbed hydrogen-rich stream may be compressed in a recycle compressor 142 to provide a recycle hydrogen stream and supplemented with make-up hydrogen stream from line 144 in line 146 to provide the hydrogen stream in hydrogen lines 69 and 73.

The hydroprocessing stripping column 150 may be in downstream communication with the hot separator 52 and the cold separator 58 and in direct, downstream communication with the cold flash drum 134 and the hot flash drum 126 for stripping portions of the second hydroprocessing effluent stream. The hydroprocessing stripping column 150 strips gases from the cold flash bottoms stream 138 and the hot flash bottoms stream 130 by use of a stripping media such as steam from line 152. The cold flash bottoms stream 138 may enter the hydroprocessing fractionation column 150 at a higher elevation than the hot flash bottoms stream 130. The hydroprocessing stripping column 150 may produce an overhead stripping stream in overhead line 154. The overhead stripping stream may be condensed and separated in a receiver with a portion of the condensed liquid being refluxed back to the hydroprocessing stripping column 150. The hydroprocessing stripping column 150 may be operated with a bottoms temperature between about 232° (450° F.) and about 288° C. (550° F.) and an overhead pressure of about 690 kPa (gauge) (100 psig) to about 1034 kPa (gauge) (150 psig). The stripped bottoms stream in stripped bottoms line 159 is heated and fed to the prefractionation column 160.

The prefractionation column 160 may be in downstream communication with the hydroprocessing stripping column 150 and the second hydroprocessing zone 70 and, optionally, the first hydroprocessing zone 60 for separating portions of the first hydroprocessing effluent and the second hydroprocessing effluent into product streams and an FCC feed stream by fractionation. The hydroprocessing prefractionation column 160 fractionates the stripped bottoms stream 159 by use of a stripping media such as steam from line 162. The product streams produced by the hydroprocessing prefractionation column 160 may include an overhead LPG stream in overhead line 164, a naphtha stream in line 166, a diesel stream carried in line 168 from a side outlet and an FCC feed stream from a bottoms outlet 170o may be supplied to an FCC feed line 170 which may be fed to the FCC unit 10. An overhead stream may be condensed and separated in a receiver with a portion of the condensed liquid being refluxed back to the hydroprocessing prefractionation column 160. The net naphtha stream in line 166 may require further processing such as in a naphtha splitter column before blending in the gasoline pool. The prefractionation column 160 may be operated with a bottoms temperature between about 288° C. (550° F.) and about 370° C. (700° F.)

and at an overhead pressure between about 30 kPa (gauge) (4 psig) to about 200 kPa (gauge) (29 psig).

The net naphtha stream preferably has an initial boiling point (IBP) in the $C_5$ range; i.e., between about 0° C. (32° F.) and about 35° C. (95° F.), and an end point (EP) at a temperature greater than or equal to about 127° C. (260° F.). An optional heavy naphtha fraction has an IBP just above about 127° C. (260° F.) and an EP at a temperature above about 204° C. (400° F.), preferably between about 200° C. (392° F.) and about 221° C. (430° F.). The diesel stream has an IBP in the $C_5$ range if no heavy naphtha cut is taken or at about the EP temperature of the heavy naphtha if a heavy naphtha cut is taken and an EP in a range of about 360° C. (680° F.) to about 382° C. (720° F.). The diesel stream may have a T5 in the range of about 213° C. (416° F.) to about 244° C. (471° F.) and a T95 in the range of about 354° C. (669° F.) to about 377° C. (710° F.). The FCC feed stream has an IBP just above the EP temperature of the diesel stream and an EP in a range of about 510° C. (950° F.) to about 927° C. (1700° F.). The FCC feed stream may have a T5 in the range of about 332° C. (630° F.) to about 349° C. (660° F.) and a T95 in the range of about 510° C. (950° F.) to about 900° C. (1652° F.) and includes everything boiling at a higher temperature.

The FIG. 1 shows a typical FCC unit 10 in downstream communication with the hydroprocessing unit 30. Additionally, the FCC unit is downstream communication with the hydroprocessing separation section 50 and specifically the bottom outlet 170o of the prefractionation column 160, the second outlet 80o of the second hydroprocessing zone 70 and optionally, the first outlet 71o of the first hydroprocessing zone 60. In the FCC unit 10 a portion of the second hydroprocessed effluent stream comprising the FCC feed stream in the FCC feed line 170 is fed to the FCC reactor 12 to be contacted with a regenerated cracking catalyst. Specifically, in an embodiment, regenerated cracking catalyst entering from a regenerator conduit 18 is contacted with the FCC feed stream comprising a portion of the second hydroprocessed effluent in a riser 20 of the FCC reactor 12. The regenerator conduit 18 is in downstream communication with the regenerator 14. The riser 20 has an inlet 18i in downstream communication with said regenerator conduit 18. The regenerator conduit 18 is connected to the FCC riser 20 at a lower end.

Ensuring that the cracking catalyst has sufficient coke on catalyst when it contacts the hydroprocessed feed stream will operate to maximize the yield of diesel in the FCC product. Increasing coke on catalyst can be achieved by recycling spent catalyst that has not undergone regeneration to the FCC reactor. In an aspect, spent cracking catalyst entering from a recycle catalyst conduit 19 is contacted with the FCC feed stream comprising a portion of the second hydroprocessed effluent in a riser 20 of the FCC reactor 12 without the spent catalyst undergoing regeneration. The spent catalyst will increase the coke concentration of catalyst in the FCC reactor 12.

The recycle of spent catalyst through the recycle catalyst conduit can also be used to increase the ratio of catalyst-to-oil in the reactor to a total catalyst-to-oil ratio of about 8 to about 20 and preferably about 11 to about 18. We have found that coke on recycled catalyst between 0.7 and about 1.1 and preferably above 0.99 can increase selectivity to LCO from the FCC reactor 12 by up to 2.2 wt %. By using spent catalyst recycle, the fraction of spent catalyst recycled to the riser can comprise between about 10 and about 50 wt % of the catalyst in the riser 20 of the FCC reactor 12, preferably between about 13 and about 48 wt %. The average coke on the blend of spent and regenerated catalyst in the riser 20 may range between about 0.1 and about 0.6 wt %, preferably between about 0.1 and about 0.5 wt %. The recycle conduit 19 is in downstream communication with a riser outlet 20o. A riser inlet 20i is in downstream communication with the recycle conduit 19 at an outlet end of the recycle conduit 19. The recycle conduit 19 is connected to the riser 20 at the outlet end of the recycle conduit. The recycle conduit 19 bypasses the regenerator 14 by being in downstream communication with the riser outlet 20o and the riser inlet 20i being in direct, downstream communication with the recycle conduit. Consequently, spent catalyst entering the recycle conduit 19 passes back to the riser 20 before any of it enters the regenerator 14. The recycle conduit 19 has no direct communication with the regenerator 14.

Due to the high flow rate of catalyst in the riser 20, protrusions 21 may be installed on a wall of the riser extending inwardly into the riser to urge catalyst away from the wall of the riser toward the center of the riser where the feed may be more concentrated.

A portion of the first hydroprocessed effluent stream in the first hydroprocessed effluent line 71 may also be fed to the FCC reactor 12. Specifically, in an embodiment, the regenerated cracking catalyst and optionally the spent cracking catalyst is contacted with a portion of the second hydroprocessed effluent in a riser 20 of the FCC reactor 12. In such case, a portion of the first hydroprocessed effluent stream may be fed to the riser 20 of the FCC reactor 12 in the FCC feed stream as part of the second hydroprocessed effluent stream in the second hydroprocessed effluent line 80 or a portion of the first hydroprocessed effluent may be fed to the riser 20 of the FCC reactor 12 after bypassing the second hydroprocessing zone 70 altogether. Portions of the first hydroprocessing effluent stream and the second hydroprocessing effluent stream may be fed to the riser 20 through the same or different distributors 16. In the riser 20 of the FCC reactor 12, the FCC feed stream comprising portions of the first hydroprocessed effluent stream and the second hydroprocessed effluent stream are contacted with catalyst to catalytically crack the FCC feed stream to provide a cracked stream.

The contacting of the first hydroprocessed effluent stream and the second hydroprocessed effluent stream with cracking catalyst may occur in the riser 20 of the FCC reactor 12, extending upwardly to the bottom of a reactor vessel 22. The contacting of feed and catalyst is fluidized by gas from a fluidizing line 24. Heat from the catalyst vaporizes the first hydroprocessed effluent stream and the second hydroprocessed effluent stream, and the hydroprocessed effluent streams are thereafter cracked to lighter molecular weight hydrocarbons in the presence of the cracking catalyst as both are transferred up the riser 20 into the reactor vessel 22. In the FCC reactor 12, saturated naphthenic rings are cracked open and alkyl substituents are cracked from aromatic rings to provide olefinic, aliphatic hydrocarbons in addition to catalytic cracking of the FCC feed stream to conventional cracked products such as gasoline and diesel. The cracked stream of hydrocarbon products and spent catalyst in the riser 20 are thereafter discharged from the riser outlet 20o into a disengaging chamber 27 which contains the riser outlet. The cracked stream of hydrocarbon products is disengaged from the cracking catalyst in the disengaging chamber 27 using a rough cut separator 26. Cyclonic separators which may include one or two stages of cyclones 28 in the reactor vessel 22 further separate catalyst from hydrocarbon products. A cracked stream of product gases exit the reactor vessel 22 through a product outlet 31 to line 32 for transport to a downstream FCC recovery section 90. In an embodiment, the recycle conduit 19 and the regenerator conduit 18 are in downstream communication with the disengaging chamber 27. The outlet temperature of the cracked products leaving the riser 20 should be between about 472° C. (850° F.) and about 538° C. (1000° F.) to achieve higher selectivity to LCO and gasoline.

Inevitable side reactions occur in the riser 20 leaving coke deposits on the catalyst that lower catalyst activity. The spent or coked catalyst requires regeneration for further use. Coked catalyst, after separation from the gaseous cracked product hydrocarbons, falls into a stripping section 34 where steam is injected through a nozzle 35 and distributor to purge any residual hydrocarbon vapor. After the stripping operation, a portion of the spent catalyst is fed to the catalyst regenerator 14 through a spent catalyst conduit 36. The catalyst regenerator 14 may be in downstream communication with the riser 20, specifically, the riser outlet 20o. Another portion of the spent catalyst is recycled through recycle catalyst conduit 19 to the riser 20 as previously described.

FIG. 1 depicts a regenerator 14 known as a combustor. However, other types of regenerators are suitable. In the catalyst regenerator 14, a stream of oxygen-containing gas, such as air, is introduced from line 37 through an air distributor 38 to contact the coked catalyst, burn coke deposited thereon, and provide regenerated catalyst and flue gas. Catalyst and air flow upwardly together along a combustor riser 40 located within the catalyst regenerator 14 and, after regeneration, are initially separated by discharge through a disengager 42. Finer separation of the regenerated catalyst and flue gas exiting the disengager 42 is achieved using first and second stage separator cyclones 44, 46, respectively, within the catalyst regenerator 14. Catalyst separated from flue gas dispenses through diplegs from cyclones 44, 46 while flue gas significantly lighter in catalyst sequentially exits cyclones 44, 46 and exit the regenerator vessel 14 through flue gas outlet 47 in line 48. Regenerated catalyst is recycled back to the reactor riser 20 through the regenerated catalyst conduit 18.

As a result of the coke burning, the flue gas vapors exiting at the top of the catalyst regenerator 14 in line 48 contain $CO$, $CO_2$ and $H_2O$, along with smaller amounts of other species. Catalyst regeneration temperature is between about 500° C. (932° F.) and about 900° C. (1652° F.). Both the cracking and regeneration occur at an absolute pressure below about 5 atmospheres.

In the FCC recovery section 90, a recycle cracked stream is separated from the cracked stream. The gaseous cracked stream in line 32 is fed to a lower section of an FCC main fractionation column 92. The main fractionation column 92 is in downstream communication with the riser 20 and the FCC reactor 12. Several fractions may be separated and taken from the main fractionation column 92 including a heavy slurry oil stream from a bottom outlet 93o in line 93, a HCO stream in line 94, a LCO stream in line 95 and an optional heavy naphtha stream in line 98. Gasoline and gaseous light hydrocarbons are removed in overhead line 97 from the main fractionation column 92 and condensed before entering a main column receiver 99. An aqueous stream is removed from a boot in the receiver 99. Moreover, a condensed unstabilized, light naphtha stream is removed in bottoms line 101 while a gaseous light hydrocarbon stream is removed in overhead line 102. Both streams in lines 101 and 102 may enter a vapor recovery section downstream of the main fractionation column 92. A portion of the light naphtha stream in bottoms line 101 may be refluxed to the main fractionation column 92.

The light unstabilized naphtha fraction preferably has an initial boiling point (IBP) in the $C_5$ range; i.e., between about 0° C. (32° F.) and about 35° C. (95° F.), and an end point (EP) at a temperature greater than or equal to about 127° C. (260° F.). The optional heavy naphtha fraction has an IBP just above about 127° C. (260° F.) and an EP at a temperature above about 204° C. (400° F.), preferably between about 200° C. (392° F.) and about 221° C. (430° F.). The LCO stream has an IBP in the $C_5$ range if no heavy naphtha cut is taken or at about the EP temperature of the heavy naphtha if a heavy naphtha cut is taken and an EP in a range of about 360° C. (680° F.) to about 382° C. (720° F.). The LCO stream may have a T5 in the range of about 213° C. (416° F.) to about 244° C. (471° F.) and a T95 in the range of about 354° C. (669° F.) to about 377° C. (710° F.). The HCO stream has an IBP just above the EP temperature of the LCO stream and an EP in a range of about 385° C. (725° F.) to about 427° C. (800° F.). The HCO stream may have a T5 in the range of about 332° C. (630° F.) to about 349° C. (660° F.) and a T95 in the range of about 382° C. (720° F.) to about 404° C. (760° F.). The heavy slurry oil stream has an IBP just above the EP temperature of the HCO stream and includes everything boiling at a higher temperature.

The main fractionation column 92 has a main outlet 93o in a bottom of the main fractionation column 104 from which the recycle cracked stream is taken. The second inlet 110i to the second hydroprocessing zone 70 may be in downstream communication with the main outlet 93o. In an aspect, the second inlet 110i may be in downstream communication with the main outlet 93o. The recycle cracked stream may be recycled to the hydroprocessing unit 30. In an embodiment, the recycle cracked stream comprising a cycle oil stream may be transported to the second inlet 110i to the second hydroprocessing zone 70 in recycle line 110. The recycle line 110 is in downstream communication with said FCC reactor 10 and the main fractionation column 92, and the hydroprocessing unit 30 is in downstream communication with the recycle line 110. A portion of the slurry oil stream in line 93 may be cooled and recycled in line 91 back to the main fractionation column 92.

A lowest auxiliary outlet 94o and a penultimate lowest outlet 95o may be in the side 106 of the main fractionation column 92. The recycle line 110 may transport a recycle cracked stream comprising at least a portion of the HCO side stream from the lowest main outlet 94o to the second hydroprocessing zone 70 through the second inlet 110i by recycle line 110. If it is desired to recycle HCO to the hydroprocessing unit 30 or specifically to the second hydroprocessing zone 70 thereof, an HCO stream is taken as a recycle cracked stream in line 94 from the lowest auxiliary outlet 94o in the side 106 of the main fractionation column 92 regulated by a control valve on line 115. When the control valve on line 115 is opened, the second inlet 110i to the second hydroprocessing zone 70 is in downstream communication with the lowest auxiliary outlet 94o. By recycling an HCO stream to the hydroprocessing unit 30 or specifically to the second hydroprocessing zone 70 in lines 94, 115 and 110, the yield of diesel and gasoline may be increased in the FCC unit over a yield that would have been obtained without recycling the HCO stream. The diesel stream may be recovered in an LCO product line 117 at a flow rate regulated by a control valve thereon and in the diesel line 168 from the prefractionation column 160. In an aspect, at least 5 wt %, suitably at least 50 wt %, preferably at least 75 wt % and up to all of the HCO in line 95 may be recycled to the hydroprocessing unit 30 or specifically the second hydroprocessing zone 70. In an embodiment, about 5 to about 25 wt %, preferably about 10 to about 20 wt % of the hydroprocessed feed stream to the FCC unit 10 in line 170 is recycled to the hydroprocessing unit 30 in recycle line 110.

An LCO stream is taken in line 95 from the penultimate lowest auxiliary outlet 95o in the side 106 of the main fractionation column 92. An LCO product stream is taken in line 117 from line 95 regulated by a control valve on line 117. A recycle LCO stream is taken in line 116 from line 95 cooled and returned to the main column 92. Any or all of lines 94-96 may be cooled and pumped back to the main column 92 typically at a higher location. Specifically, a side stream may be taken from an outlet 94o, 95o or 96o in the side 106 of the main fractionation column 92. The side stream may be cooled and returned to the main fractionation column 92 to cool the main fractionation column 92. A heat exchanger may be in downstream communication with the side outlet 94o, 95o or 96o.

A heavy naphtha stream in line 96 may be returned to the main fractionation column 92 after cooling while a heavy naphtha product stream is taken in line 98. Gasoline may be recovered from the light naphtha stream in line 101.

A vacuum recovery section 190 is provided in downstream communication with the main fractionation column to recover more cycle oil for recycle to the FCC unit 10. The vacuum recovery section 190 may include a vacuum separator 200 in downstream communication with the FCC reactor 12 and the main outlet 93o of the main fractionation column 92 via the main bottoms line 93. In an aspect, a slurry heater 202 such as a heat exchanger is on the main bottoms line 93 in downstream communication with the main bottoms line 93 and the main outlet 93o of the main fractionation column 92. The slurry heater 202 can be used to heat the slurry oil stream to further prepare it for separation in the vacuum separator 200. The slurry heater 202 may heat the slurry oil stream to increase its temperature by about 19° C. (35° F.) to about 36° C. (65° F.), preferably by about 22° C. (40° F.) to about 31° C. (55° F.), to a heated temperature of between about 382° C. (720° F.) to about 399° C. (750° F.).

The slurry heater 202 may be a heat exchanger in communication with a loop heater 204 for heating a heat exchange fluid which may be a clean hot oil or other heating fluid. The loop heater may be an electric heater or a gas fired heater as shown in FIG. 1 which supplies the hot heating fluid to the slurry heater 202. The slurry heater 202 may be a shell and tube heat exchanger, and the slurry oil in line 93 may be pumped to a tube side 202t of the slurry heater 202. Thus, the tube side 202t is in downstream communication with the main outlet 93o. The heated slurry oil may be routed to the vacuum separator 200 in a slurry feed line 206. Hot oil from the loop heater 204 is routed to the shell side of the slurry heater 202. The cooler oil leaving the slurry heater 202 is routed back to the loop heater 204 where it is reheated and then recycled back to the slurry heater 202 in a closed loop system.

The vacuum separator 200 is in downstream communication with the heater 202. A feed inlet 206i to the vacuum separator 200 for the slurry feed line 206 admits slurry oil to the separator 200.

The vacuum separator 200 may be a fractionation column with or without a reboiler or it may be a simple one-stage flash separator. The vacuum separator 200 separates the slurry oil stream into a cycle oil stream and a heavy stream under vacuum pressure of about 5 and about 25 kPa (absolute) and a bottoms temperature between about 349° C. (660° F.) and about 377° C. (710° F.), preferably between about 354° C. (670° F.) and about 371° C. (700° F.). The cycle oil stream may comprise at least some material boiling in the LCO range and/or at least some material boiling in the HCO range.

In an aspect, the cycle oil stream boiling at or below 482° C. (900° F.) is comprised in a vaporous separator overhead stream transported in a separator overhead line 210 from a top 211 of the vacuum separator 200 while the heavy stream is in a separator bottoms stream transported in a separator bottoms line 212 from a bottom of the vacuum separator 200. An optional vacuum recycle line 214 may be in downstream communication with the separator bottoms line 212 and the separator 200 may be in downstream communication with the recycle line. The vacuum recycle line 214 recycles a portion of the heavy stream from the separator bottoms line 212 from a bottom of the separator 200 back to the separator 200. The vacuum recycle line 214 recycles to a recycle inlet 214i that is above a feed inlet 206i of the slurry oil stream to the separator 200. The net heavy stream comprising concentrated slurry oil is removed in line 216 and can be sold as fuel oil or as feed to a coker unit or for carbon black production.

A cooler 220 may be in downstream communication with the separator overhead line 210 for cooling and condensing the separator overhead stream. The condensed separator overhead stream enters a receiver 230 in downstream communication with the separator overhead line 210 from a top of the separator 200. The condensed overhead stream is separated in the receiver 230 into the liquid cycle oil stream taken from a bottom of the receiver 230 in a receiver bottoms line 234 and a vaporous receiver overhead stream taken in receiver overhead line 232. The liquid cycle oil stream in the receiver bottoms line 234 is HCO rich and may comprise LCO. The liquid cycle oil stream in the receiver bottoms line 234 can be taken to a diesel pool. In an embodiment, the hydroprocessing unit 30 and/or the FCC unit 10 are in downstream communication with the receiver bottoms line 234 and/or the vacuum separator overhead line 210 from a top 211 of the vacuum separator 200. The recycle line 110 takes the liquid cycle oil stream in receiver bottoms line 234 as the recycle cracked stream to the second inlet 110i to the second hydroprocessing zone 70. The recycle line 110 may be in downstream communication with the vacuum separator 200. The receiver 230 may be operated under vacuum pressure of about 2 and about 10 kPa (absolute) and a temperature between about 37° C. (100° F.) to about 149° C. (300° F.), preferably no more than about 121° C. (250° F.).

The cycle oil stream recovered in the receiver bottoms line 234 may comprise about 5 to about 50 vol % and suitably about 20 to about 30 vol % of the slurry oil stream in main column bottoms line 93. Additionally, the API of the cycle oil stream in line 234 may increase 1-5 and suitably 2-4 API numbers relative to the slurry oil stream in main column bottoms line 93.

In an embodiment, if the vacuum separator 200 is a vacuum fractionation column, a portion of the liquid cycle oil stream in receiver bottoms line 234 may be refluxed as a reflux stream in a reflux line 236 to the vacuum separator 200 through the reflux inlet 236i. The reflux line 236 may be in downstream communication with the receiver bottoms line 234 and the vacuum separator 200, and the vacuum separator may be in downstream communication with the reflux line 236. The reflux inlet 236i to the vacuum separator 200 is for the reflux line 236 which is at a higher elevation than the feed inlet 214i to the separator 200 for the slurry feed line 93 and a recycle inlet 214i to the separator 200 for the vacuum recycle line 214. In this embodiment, a packing 238 may be disposed in the vacuum column between the recycle inlet 214i and the reflux inlet 236i. Refluxing the liquid cycle oil stream to the vacuum fractionation column enables control of the end point of the liquid cycle oil stream to satisfy feed requirements to downstream units, such as the FCC unit 10.

The vacuum separator 200 is operated at below atmospheric pressure in the separator overhead line 210. A vacuum generation device 240 such as an eductor or a vacuum pump is in downstream communication with the receiver overhead line 232 of the receiver 230 for pulling a vacuum on the receiver overhead stream from the receiver 230. In an embodiment, when the vacuum generation device 240 is an eductor, the eductor may be in downstream communication with an inert gas stream 242 such as steam which pulls a vacuum on the receiver overhead stream in the receiver overhead line 232. The eductor feeds the inert gas stream mixed with the receiver overhead stream to a condenser. The condensed mixture of the inert gas stream and the receiver overhead stream exit the condenser and enter into a drain drum 250. A vaporous hydrocarbon stream in line 252 from the drain drum 250 may be vented to flare or recovery. A condensed stream of sour water may also be removed from the drain drum in drum bottoms line 254 and taken to water treatment facilities for the FCC unit 10 which is not described.

EXAMPLES

Example 1

In a commercial FCC unit processing 166.1 m$^3$/h (24,319 BPD) of vacuum gas oil feed and utilizing spent catalyst recycle in which a portion of the spent catalyst was recycled without undergoing regeneration while the other portion of catalyst is regenerated to provide a regenerated catalyst temperature of 730° C. The riser outlet temperature was 545° C. The ratio of catalyst-to-oil which was the sum of recycle and regenerated catalyst to oil fed to the riser was modulated at different levels to test the effect of coke on recycled catalyst on LCO selectivity. Test conditions are shown in Table 1. LCO selectivity is the ratio of LCO product flow rate to the sum of the product flow rates of LCO and slurry oil. The average coke on blended catalyst is the weight ratio of coke on catalyst to the total catalyst in the riser.

TABLE 1

| Coke on Recycled Catalyst, wt % | Catalyst-to-Oil Ratio | LCO Selectivity, wt % | Recycled Catalyst in Riser, wt % | Average coke on blended catalyst, wt % |
|---|---|---|---|---|
| 0.78 | 10.9 | 64.2% | 13.7 | 0.107 |
| 0.99 | 14.8 | 65.9% | 38.5 | 0.381 |
| 1.08 | 17.7 | 66.4% | 47.5 | 0.513 |

Figure 2:
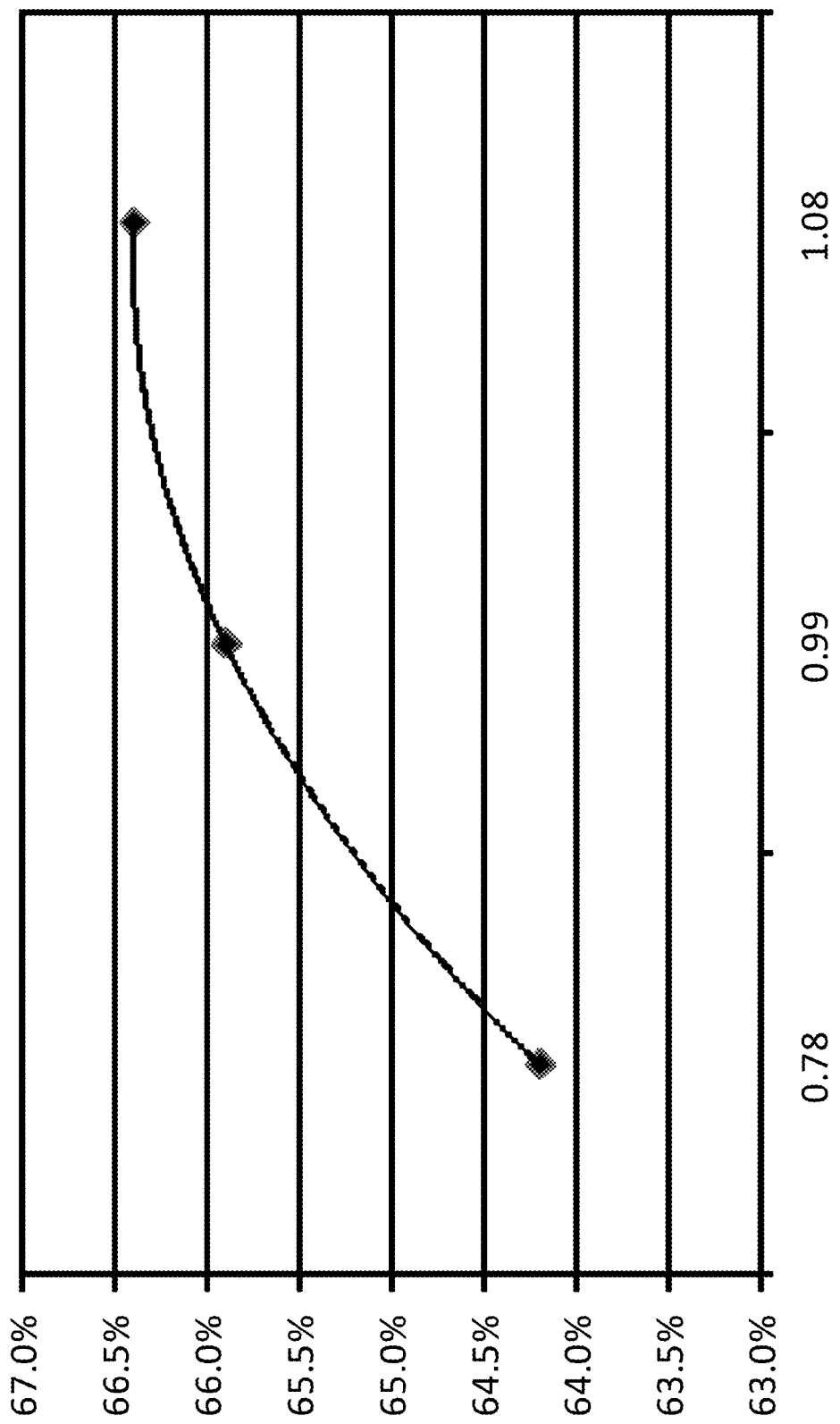
FIG. 2 is a plot of LCO selectivity as a function of coke on recycle catalyst.

FIG. 2 is a plot of LCO selectivity as a function of coke on recycled catalyst. The plot of FIG. 2 shows that coke on recycled catalyst of between about 0.7 and about 1.1 wt % provides greater selectivity to LCO. Particularly, greater than about 0.99 and less than about 1.1 or 1.2 wt % coke on recycled catalyst appears to provide a maximum LCO selectivity.

Example 2

We simulated a hydroprocessing unit upstream of an FCC unit to further demonstrate the capability of the described apparatus and process with the recycle of HCO. The simulated Base Case feeds 7,949 m$^3$/day (50,000 BPD) of VGO feed having an API of 23.8 to a hydroprocessing unit to prepare FCC feed for the FCC unit after removing products in a prefractionation column. The hydroprocessing pressure is 9.7 MPa (1400 psig), and the FCC riser outlet temperature is 518° C. (965° F.). FCC product is recovered in a conventional main fractionation column. HCO from a lowest side outlet of the main column is blended with the VGO feed when it is recycled to the hydroprocessing unit. Yields entail combined recoveries obtained from both the main fractionation column and the prefractionation column. The distillate boiling range is 171-349° C. (340-660° F.) and the slurry oil boiling range is over 349° C. (660° F.).

Scheme 1 differs in operation from the Base Case in that a portion of spent catalyst is recycled to contact the feed without undergoing regeneration. The ratio of recycled spent catalyst to regenerated catalyst contacted with the feed was 0.75 to 1. The improved operation provides an increased yield over the Base Case in distillate production with reductions in all other products except for fuel gas which stayed the same.

Scheme 2 differs from the Base Case in that a vacuum column receives the main fractionation column slurry stream and a liquid cycle oil stream from a vacuum overhead comprising material boiling at or below 482° C. (900° F.) recycles to the hydroprocessing unit with the HCO recycle stream from the main fractionation column. The improved operation provides an increased yield in all product categories including distillate production over the Base Case with reduction only in the waste slurry oil stream.

Scheme 3 differs from the Scheme 2 in that the recycle stream of vacuum column overhead and HCO from the main column is segregated from the VGO feed to the hydroprocessing unit. The recycle stream recycles to only to a second aromatic saturation zone of the hydroprocessing unit while bypassing a first hydroprocessing zone of the hydroprocessing unit. The improved operation provides an increased yield in distillate production with reductions in all other products over Scheme 2.

Scheme 4 differs from the Scheme 3 in that a portion of spent catalyst recycles to contact the feed without undergoing regeneration. The improved operation provides an increased yield over Scheme 3 in distillate production with reductions in all other products.

Scheme 5 differs from Scheme 4 in that a heater heats the main column slurry stream from a bottoms temperature of 363° C. (685° F.) to a heated temperature of 388° C. (730° F.) before it is fed to the vacuum column. The improved operation provides an increased yield in all product categories with the largest improvement in distillate production with a marked reduction in slurry oil production over Scheme 4.

TABLE 2

|  | Base Case | Scheme 1 | Scheme 2 | Scheme 3 | Scheme 4 | Scheme 5 |
|---|---|---|---|---|---|---|
| Cycle Oil Recycle Option | Blended | Blended | Blended | Segregated | Segregated | Segregated |
| Fractionation Option | Main Column | Main Column | Main Column/ Vacuum Column | Main Column/ Vacuum Column | Main Column/ Vacuum Column | Main Column/ Heater/ Vacuum Column |
| Spent Catalyst Recycle Option | No | Yes | No | No | Yes | Yes |
| Total Yields on Fresh Feed, wt % | | | | | | |
| Fuel Gas | 2.08 | 2.08 | 2.10 | 2.07 | 2.06 | 2.07 |
| LPG | 13.98 | 13.93 | 14.06 | 13.88 | 13.84 | 13.90 |
| Gasoline | 37.88 | 37.74 | 38.09 | 37.68 | 37.57 | 37.74 |
| Distillate | 35.55 | 35.79 | 35.75 | 36.49 | 36.68 | 36.95 |
| Slurry Oil | 5.59 | 5.57 | 5.06 | 4.99 | 4.98 | 4.45 |
| Coke | 4.92 | 4.90 | 4.95 | 4.88 | 4.87 | 4.89 |

Example 3

We simulated a fractionation unit downstream of hydroprocessing unit and an FCC unit to demonstrate the capability of the described apparatus and process. The simulated operation utilized one hydroprocessing unit and one FCC reactor and a feed rate of 296,372 kg/hr (50,000 bpsd, 653,390 lb/hr) of hydrotreated VGO feedstock to the FCC reactor. LCO produced at the main fractionation column boiled at 221-349° C. (430-660° F.) while the total LCO recovered as product boiled at 174-349° C. (345-660° F.). The HCO recycle to the hydroprocessing unit is produced at the FCC main fractionation column from a side outlet. To produce the HCO recycle of 12.5 vol % of fresh feed, which is 994 m³/day (6250 BPD), main fractionation column operation was adjusted. The liquid products that can be produced at the FCC main fractionation column are shown in Table 3. Light gasoline boiled at $C_5$-174° C. (345° F.), and heavy gasoline boiled at 174-221° C. (345-430° F.).

TABLE 3

| | |
|---|---|
| Light Gasoline, m³/day (BPD) | 3905 (24565) |
| Heavy Gasoline to be blended with LCO, m³/day (BPD) | 956 (6013) |
| LCO produced at Main Column, m³/day (BPD) | 605 (3803) |
| Total LCO produced, m³/day (BPD) | 1560 (9816) |
| HCO Recycle From Main Column to Hydroprocessing Unit, m³/day (BPD) | 994 (6250) |
| Slurry, m³/day (BPD) | 437 (2750) |
| Main Column Total Liquid Product and Recycle, m³/day (BPD) | 6897 (43381) |

Table 4 shows a case in which the slurry oil stream from the main column bottoms is routed to a vacuum separator. The operation at main column was adjusted and this resulted in less production of slurry oil and more production of LCO. The HCO recycle stream from the side of the main column is reduced to allow production of more LCO from the main column. The recycle flow rate is maintained at 12.5 vol % of fresh feed. This was achieved by recycling cycle oil from the vacuum column overhead stream along with the HCO recycle stream from the main column.

TABLE 4

| | |
|---|---|
| Light Gasoline, m³/day (BPD) | 3905 (24565) |
| Heavy Gasoline to be blended with LCO, m³/day (BPD) | 956 (6013) |
| LCO produced at Main Column, m³/day (BPD) | 648 (4078) |
| Total LCO produced, m³/day (BPD) | 1604 (10091) |
| Vacuum Column Overhead Recycle, m³/day (BPD) | 44 (275) |
| HCO Recycle From Main Column, m³/day (BPD) | 950 (5975) |
| Total Recycle to Hydroprocessing Unit: HCO from Main Column & Vacuum Column Overhead, m³/day (BPD) | 994 (6250) |
| Slurry, m³/day (BPD) | 394 (2475) |
| Main Column Total Liquid Product and Recycle, m³/day (BPD) | 6897 (43381) |

The recycle of vacuum column overhead material to the hydroprocessing unit results in shifting HCO to LCO in the FCC main fractionation column which increases diesel recovery in the substance of LCO by 44 m³ or 275 barrels per day from FCC or 0.55 vol % on fresh feed.

Table 5 shows a case in which the slurry oil stream from the main column bottoms is routed to a vacuum separator after being heated in a slurry heater to 388° C. (730° F.). The operation at main column was adjusted and this resulted in less production of slurry oil and more production of LCO at the main column. The HCO recycle stream from the side of the main column is reduced even more to allow production of even more LCO from the main column. The recycle flow rate to the hydroprocessing unit is again maintained at 12.5 vol % of fresh feed. This was achieved by recycling twice as much cycle oil from the vacuum column overhead stream along with the HCO recycle stream from FCC main column. The additional vacuum column overhead flow rate was achieved by heating the main column bottom slurry product stream.

TABLE 5

| | |
|---|---|
| Light Gasoline, m³/day (BPD) | 3905 (24565) |
| Heavy Gasoline to be blended with LCO, m³/day (BPD) | 956 (6013) |
| LCO produced at Main Column, m³/day (BPD) | 692 (4352) |
| Total LCO produced, m³/day (BPD) | 1648 (10365) |
| Vacuum Column Overhead Recycle, m³/day (BPD) | 87 (550) |
| HCO Recycle From Main Column, m³/day (BPD) | 906 (5700) |
| Total Recycle To hydroprocessing Unit: HCO from Main Column and Vacuum Column Overhead, m³/day (BPD) | 994 (6250) |
| Slurry, m³/day (BPD) | 350 (2200) |
| Main Column Total Liquid Product and Recycle, m³/day (BPD) | 6897 (43381) |

By heating the slurry oil stream prior to entry into the vacuum column separator, the vacuum column overhead doubles for recycle. The recycle of vacuum column overhead material to hydroprocessing unit results in shifting HCO to LCO in the main FCC main fractionation column which increases diesel recovery in the substance of LCO by 87 m³ or 550 barrels per day from the FCC unit or 1.1 vol % on fresh feed.

Specific Embodiments

While the following is described in conjunction with specific embodiments, it will be understood that this description is intended to illustrate and not limit the scope of the preceding description and the appended claims.

A first embodiment of the invention is a process for catalytically cracking hydrocarbons comprising feeding a fresh hydrocarbon feed stream to a first hydroprocessing zone to hydroprocess the hydrocarbon feed stream to provide a first hydroprocessed effluent stream; feeding a recycle cracked stream to a second hydroprocessing zone to hydroprocess the recycle cracked stream and provide a second hydroprocessed effluent stream; separating hydroprocessed products from the first hydroprocessed effluent stream and the second hydroprocessed effluent stream to provide an FCC feed stream; feeding the FCC feed stream to an FCC reactor and contacting the FCC feed stream with catalyst to catalytically crack the FCC feed stream to provide a cracked stream; disengaging the catalyst from the cracked stream; and separating the recycled cracked stream from the cracked stream. An embodiment of the invention is one, any or all of prior embodiments in this paragraph up through the first embodiment in this paragraph further comprising passing the first hydroprocessed effluent to the second hydroprocessing zone. An embodiment of the invention is one, any or all of prior embodiments in this paragraph up through the first embodiment in this paragraph further comprising bypassing a portion of the first hydroprocessed effluent stream around the second hydroprocessing zone. An embodiment of the invention is one, any or all of prior embodiments in this paragraph up through the first embodiment in this paragraph further comprising feeding the cracked stream to a main fractionation column and taking the recycle cracked stream from an outlet in a side of the main fractionation column. An embodiment of the invention is one, any or all of prior embodiments in this paragraph up through the first embodiment in this paragraph further comprising fractionating the cracked stream into products including a slurry oil stream from a bottom of a main fractionation column; separating the slurry oil stream into a cycle oil stream and a heavy stream under vacuum pressure; and recycling the cycle oil stream as the recycle cracked stream. An embodiment of the invention is one, any or all of prior embodiments in this paragraph up through the first embodiment in this paragraph further comprising heating the slurry oil stream before separating the slurry oil stream. An embodiment of the invention is one, any or all of prior embodiments in this paragraph up through the first embodiment in this paragraph wherein more hydrodemetallization occurs in the first hydroprocessing zone than in the second hydroprocessing zone. An embodiment of the invention is one, any or all of prior embodiments in this paragraph up through the first embodiment in this paragraph wherein more hydrodenitrification occurs in the first hydroprocessing zone than in the second hydroprocessing zone. An embodiment of the invention is one, any or all of prior embodiments in this paragraph up through the first embodiment in this paragraph wherein more aromatic saturation occurs in the second hydroprocessing zone than in the first hydroprocessing zone. An embodiment of the invention is one, any or all of prior embodiments in this paragraph up through the first embodiment in this paragraph wherein more hydrodesulfurization occurs in the first hydroprocessing zone than in the second hydroprocessing zone. An embodiment of the invention is one, any or all of prior embodiments in this paragraph up through the first embodiment in this paragraph wherein said separation of said hydroprocessed products from said first hydroprocessed effluent stream and said second hydroprocessed effluent stream to provide an FCC feed stream is performed in a fractionation column. An embodiment of the invention is one, any or all of prior embodiments in this paragraph up through the first embodiment in this paragraph further comprising regenerating a portion of the catalyst disengaged from the cracked stream and recycling a second portion of the catalyst disengaged from the cracked stream to be contacted with the FCC feed stream without undergoing regeneration. An embodiment of the invention is one, any or all of prior embodiments in this paragraph up through the first embodiment in this paragraph wherein the fresh hydrocarbon feed stream comprises vacuum gas oil having a T5 of at least 316° C. (600° F.).

A second embodiment of the invention is a process for catalytically cracking hydrocarbons comprising feeding a fresh hydrocarbon feed stream to a first hydroprocessing zone to hydroprocess the hydrocarbon feed stream to provide a first hydroprocessed effluent stream; feeding a recycle cracked stream to a second hydroprocessing zone that comprises a catalyst that is active for saturating aromatic rings to hydroprocess the recycle cracked stream to provide a second hydroprocessed effluent stream; separating hydroprocessed products from the first hydroprocessed effluent stream and the second hydroprocessed effluent stream in a fractionation column to provide an FCC feed stream; feeding the FCC feed stream to an FCC reactor and contacting the FCC feed stream with catalyst to catalytically crack the FCC feed stream to provide a cracked stream; disengaging the catalyst from the cracked stream; and separating the recycled cracked stream from the cracked stream. An embodiment of the invention is one, any or all of prior embodiments in this paragraph up through the second embodiment in this paragraph further comprising fractionating the cracked stream into products including a slurry oil stream from a bottom of a main fractionation column; separating the slurry oil stream into a cycle oil stream and a heavy stream under vacuum pressure; and recycling the cycle oil stream as the recycle cracked stream. An embodiment of the invention is one, any or all of prior embodiments in this paragraph up through the second embodiment in this paragraph further comprising heating the slurry oil stream before separating the slurry oil stream. An embodiment of the invention is one, any or all of prior embodiments in this paragraph up through the second embodiment in this paragraph further comprising regenerating a portion of the catalyst disengaged from the cracked stream and recycling a second portion of the catalyst disengaged from the cracked stream to be contacted with the FCC feed stream without undergoing regeneration. An embodiment of the invention is one, any or all of prior embodiments in this paragraph up through the second embodiment in this paragraph further comprising passing a portion of the first hydroprocessed effluent stream to the second hydroprocessing zone and bypassing another portion of the first hydroprocessed effluent stream around the second hydroprocessing zone.

A third embodiment of the invention is a process for catalytically cracking hydrocarbons comprising feeding a fresh hydrocarbon feed stream to a first hydroprocessing zone to hydroprocess the hydrocarbon feed stream to provide a first hydroprocessed effluent stream; feeding a recycle cracked stream to a second hydroprocessing zone to hydroprocess the recycle cracked stream and provide a second hydroprocessed effluent stream; feeding at least a portion of the first hydroprocessed effluent to the second hydroprocessing zone; separating an FCC feed stream from the second hydroprocessed effluent stream; feeding the FCC feed stream to an FCC reactor and contacting the FCC feed stream with catalyst to catalytically crack the FCC feed stream to provide a cracked stream; disengaging the catalyst from the cracked stream; fractionating the cracked stream into products including a slurry oil stream from a bottom of a main fractionation column; separating the slurry oil stream into a cycle oil stream and a heavy stream under vacuum pressure; and recycling the cycle oil stream as the recycle cracked stream. An embodiment of the invention is one, any or all of prior embodiments in this paragraph up through the third embodiment in this paragraph wherein the second hydroprocessing zone comprises a catalyst that is active for saturating aromatic rings. An embodiment of the invention is one, any or all of prior embodiments in this paragraph up through the third embodiment in this paragraph further comprising feeding all of the first hydroprocessed effluent to the second hydroprocessing zone.

A fourth embodiment of the invention is an apparatus for catalytically cracking hydrocarbons comprising a first hydroprocessing zone with an first inlet and a first outlet, the first inlet being in communication with a source of a fresh hydrocarbon feed stream; a second hydroprocessing zone with a second inlet and a second outlet; an FCC reactor in communication with the first outlet and the second outlet; and a main fractionation column in communication with the FCC reactor; the main fractionation column having a main outlet in a bottom of the main fractionation column, the second inlet being in downstream communication with the main outlet. An embodiment of the invention is one, any or all of prior embodiments in this paragraph up through the fourth embodiment in this paragraph wherein an auxiliary outlet is in a side of the main fractionation column and the second inlet is in downstream communication with the auxiliary outlet. An embodiment of the invention is one, any or all of prior embodiments in this paragraph up through the fourth embodiment in this paragraph further comprising a heater in communication with the main outlet. An embodiment of the invention is one, any or all of prior embodiments in this paragraph up through the fourth embodiment in this paragraph further comprising a vacuum separator in communication with the main outlet. An embodiment of the invention is one, any or all of prior embodiments in this paragraph up through the fourth embodiment in this paragraph further comprising a receiver in communication with a separator overhead line of the vacuum separator; a vacuum generation device in communication with a receiver overhead line of the receiver; and a receiver bottoms line of the receiver for providing a recycle cracked stream, the second inlet being in downstream communication with the receiver bottoms line. An embodiment of the invention is one, any or all of prior embodiments in this paragraph up through the fourth embodiment in this paragraph wherein the second hydroprocessing zone is in communication with the first outlet. An embodiment of the invention is one, any or all of prior embodiments in this paragraph up through the fourth embodiment in this paragraph further comprising a prefractionation column in communication with the second hydroprocessing zone, the FCC reactor being in downstream communication with the prefractionation column. An embodiment of the invention is one, any or all of prior embodiments in this paragraph up through the fourth embodiment in this paragraph wherein the FCC reactor comprises a riser and further comprising a recycle conduit in communication with a riser outlet and a riser inlet. An embodiment of the invention is one, any or all of prior embodiments in this paragraph up through the fourth embodiment in this paragraph wherein the first hydroprocessing zone and the second hydroprocessing zone are contained in the same reactor vessel.

A fifth embodiment of the invention is an apparatus for catalytically cracking hydrocarbons comprising a first hydroprocessing zone with an first inlet and a first outlet, the first inlet being in communication with a source of a fresh hydrocarbon feed stream; a second hydroprocessing zone with a second inlet and a second outlet; an FCC reactor in communication with the first outlet and the second outlet; a main fractionation column in communication with the FCC reactor; the main fractionation column having a main outlet in a bottom of the main fractionation column; a vacuum separator in communication with the main outlet and the second inlet being in downstream communication with the vacuum separator. An embodiment of the invention is one, any or all of prior embodiments in this paragraph up through the fifth embodiment in this paragraph wherein an auxiliary outlet is in a side of the main fractionation column and the second inlet is in downstream communication with the auxiliary outlet. An embodiment of the invention is one, any or all of prior embodiments in this paragraph up through the fifth embodiment in this paragraph further comprising a heat exchanger in communication with the main outlet. An embodiment of the invention is one, any or all of prior embodiments in this paragraph up through the fifth embodiment in this paragraph further comprising a receiver in communication with a separator overhead line of the vacuum separator; a vacuum generation device in communication with a receiver overhead line of the receiver; and a receiver bottoms line of the receiver for providing a recycle cracked stream, the second inlet being in downstream communication with the receiver bottoms line. An embodiment of the invention is one, any or all of prior embodiments in this paragraph up through the fifth embodiment in this paragraph wherein the second hydroprocessing zone is in communication with the first outlet. An embodiment of the invention is one, any or all of prior embodiments in this paragraph up through the fifth embodiment in this paragraph further comprising a prefractionation column in communication with the second hydroprocessing zone, the FCC reactor being in downstream communication with the prefractionation column. An embodiment of the invention is one, any or all of prior embodiments in this paragraph up through the fifth embodiment in this paragraph wherein the FCC reactor comprises a riser and further comprising a recycle conduit in communication with a riser outlet and a riser inlet. An embodiment of the invention is one, any or all of prior embodiments in this paragraph up through the fifth embodiment in this paragraph wherein the first hydroprocessing zone and the second hydroprocessing zone are contained in the same reactor vessel.

A sixth embodiment of the invention is an apparatus for catalytically cracking hydrocarbons comprising a first hydroprocessing zone with an first inlet and a first outlet, the first inlet being in communication with a source of a fresh hydrocarbon feed stream; a second hydroprocessing zone with a second inlet and a second outlet; an FCC reactor in communication with the first outlet and the second outlet; a main fractionation column in communication with the FCC reactor; the main fractionation column having a main outlet in a bottom of the main fractionation column; a vacuum separator in communication with the main outlet; a receiver in communication with a separator overhead line of the vacuum separator; a vacuum generation device in communication with a receiver overhead line of the receiver; and a receiver bottoms line of the receiver for providing a recycle cracked stream, and the second inlet being in downstream communication with the receiver bottoms line. An embodiment of the invention is one, any or all of prior embodiments in this paragraph up through the sixth embodiment in this paragraph further comprising a heat exchanger in communication with the main outlet.

A seventh embodiment of the invention is a process for catalytically cracking hydrocarbons comprising feeding a fresh hydrocarbon feed stream to a hydroprocessing zone to hydroprocess the hydrocarbon feed stream to provide a hydroprocessed effluent stream; separating hydroprocessed products from the hydroprocessed effluent stream to provide an FCC feed stream; feeding the FCC feed stream to an FCC reactor and contacting the FCC feed stream with catalyst to catalytically crack the FCC feed stream to provide a cracked stream; disengaging the catalyst from the cracked stream; regenerating a first portion of the catalyst disengaged from the cracked stream; and recycling a second portion of the catalyst disengaged from the cracked stream to be contacted with the FCC feed stream without undergoing regeneration, wherein the second portion has about 0.7 to about 1.1 wt % coke on catalyst. An embodiment of the invention is one, any or all of prior embodiments in this paragraph up through the seventh embodiment in this paragraph wherein a ratio of catalyst to oil in the FCC reactor is between about 8 and about 20. An embodiment of the invention is one, any or all of prior embodiments in this paragraph up through the seventh embodiment in this paragraph wherein the second portion of catalyst comprises between about 10 and about 50 wt % of the catalyst in a riser of the FCC reactor. An embodiment of the invention is one, any or all of prior embodiments in this paragraph up through the seventh embodiment in this paragraph wherein the average coke on the catalyst in the reaction zone is between about 0.1 and about 0.6 wt %. An embodiment of the invention is one, any or all of prior embodiments in this paragraph up through the seventh embodiment in this paragraph further comprising separating a recycled cracked stream from the cracked stream and feeding the recycle cracked stream to the hydroprocessing zone. An embodiment of the invention is one, any or all of prior embodiments in this paragraph up through the seventh embodiment in this paragraph further comprising feeding the cracked stream to a main fractionation column and taking the recycle cracked stream from an outlet in the main fractionation column. An embodiment of the invention is one, any or all of prior embodiments in this paragraph up through the seventh embodiment in this paragraph further comprising fractionating the cracked stream into products including a slurry oil stream from a bottom outlet of a main fractionation column; separating the slurry oil stream into a cycle oil stream and a heavy stream under vacuum pressure; and recycling the cycle oil stream as the recycle cracked stream. An embodiment of the invention is one, any or all of prior embodiments in this paragraph up through the seventh embodiment in this paragraph further comprising heating the slurry oil stream before separating the slurry oil stream. An embodiment of the invention is one, any or all of prior embodiments in this paragraph up through the seventh embodiment in this paragraph wherein the fresh hydrocarbon feed stream comprises vacuum gas oil having a T5 of at least 316° C. (600° F.).

An eighth embodiment of the invention is a process for catalytically cracking hydrocarbons comprising feeding a fresh hydrocarbon feed stream to a hydroprocessing zone to hydroprocess the hydrocarbon feed stream to provide a hydroprocessed effluent stream; separating hydroprocessed products from the hydroprocessed effluent stream to provide an FCC feed stream; feeding the FCC feed stream to an FCC reactor and contacting the FCC feed stream with catalyst to catalytically crack the FCC feed stream to provide a cracked stream; disengaging the catalyst from the cracked stream; regenerating a first portion of the catalyst disengaged from the cracked stream; recycling a second portion of the catalyst disengaged from the cracked stream to be contacted with the FCC feed stream without undergoing regeneration, wherein the second portion has about 0.7 to about 1.10 wt % coke on catalyst; and separating a recycled cracked stream from the cracked stream and feeding the recycle cracked stream to the hydroprocessing zone. An embodiment of the invention is one, any or all of prior embodiments in this paragraph up through the eighth embodiment in this paragraph wherein a ratio of catalyst to oil in the FCC reactor is between about 8 and about 20. An embodiment of the invention is one, any or all of prior embodiments in this paragraph up through the eighth embodiment in this paragraph wherein the second portion of catalyst comprises between 10 and 50 wt % of the catalyst in a riser of the FCC reactor. An embodiment of the invention is one, any or all of prior embodiments in this paragraph up through the eighth embodiment in this paragraph wherein the average coke on the catalyst in the reaction zone is between about 0.1 and about 0.6 wt %. An embodiment of the invention is one, any or all of prior embodiments in this paragraph up through the eighth embodiment in this paragraph further comprising feeding the cracked stream to a main fractionation column and taking the recycle cracked stream from an outlet in the main fractionation column. An embodiment of the invention is one, any or all of prior embodiments in this paragraph up through the eighth embodiment in this paragraph further comprising fractionating the cracked stream into products including a slurry oil stream from a bottom outlet of a main fractionation column; separating the slurry oil stream into a cycle oil stream and a heavy stream under vacuum pressure; and recycling the cycle oil stream as the recycle cracked stream. An embodiment of the invention is one, any or all of prior embodiments in this paragraph up through the eighth embodiment in this paragraph further comprising heating the slurry oil stream before separating the slurry oil stream. An embodiment of the invention is one, any or all of prior embodiments in this paragraph up through the eighth embodiment in this paragraph wherein the fresh hydrocarbon feed stream comprises vacuum gas oil having a T5 of at least 316° C. (600° F.).

A ninth embodiment of the invention is a process for catalytically cracking hydrocarbons comprising feeding a fresh hydrocarbon feed stream to a hydroprocessing zone to hydroprocess the hydrocarbon feed stream to provide a hydroprocessed effluent stream; feeding an FCC feed stream to an FCC reactor and contacting the FCC feed stream with catalyst to catalytically crack the FCC feed stream to provide a cracked stream; disengaging the catalyst from the cracked stream; regenerating a first portion of the catalyst disengaged from the cracked stream; and recycling a second portion of the catalyst disengaged from the cracked stream to be contacted with the FCC feed stream without undergoing regeneration, wherein the second portion has about 0.7 to about 1.10 wt % coke on catalyst; and separating a recycled cracked stream from the cracked stream and feeding the recycle cracked stream to the hydroprocessing zone. An embodiment of the invention is one, any or all of prior embodiments in this paragraph up through the ninth embodiment in this paragraph wherein a ratio of catalyst to oil in the FCC reactor is between about 8 and about 20. An embodiment of the invention is one, any or all of prior embodiments in this paragraph up through the ninth embodiment in this paragraph wherein the second portion of catalyst comprises between 10 and 50 wt % of the catalyst in a riser of the FCC reactor.

A tenth embodiment of the invention is an apparatus for catalytically cracking hydrocarbons comprising a hydroprocessing unit to hydroprocess a hydrocarbon feed stream to provide a hydroprocessed effluent stream; a hydroprocessing separation section in downstream communication with the hydroprocessing unit for separating hydroprocessed products to provide an FCC feed stream; FCC reactor in downstream communication with the hydroprocessing separation section for contacting the FCC feed stream with catalyst in a riser to catalytically crack the FCC feed stream to provide a cracked stream and spent catalyst; a regenerator in downstream communication with the riser outlet for regenerating the spent catalyst; and a recycle conduit in downstream communication with the riser outlet for recycling the spent catalyst to the FCC riser. An embodiment of the invention is one, any or all of prior embodiments in this paragraph up through the tenth embodiment in this paragraph further comprising a riser inlet in downstream communication with the recycle conduit. An embodiment of the invention is one, any or all of prior embodiments in this paragraph up through the tenth embodiment in this paragraph wherein the recycle conduit is connected to the FCC riser. An embodiment of the invention is one, any or all of prior embodiments in this paragraph up through the tenth embodiment in this paragraph further comprising a regenerator conduit in downstream communication with the regenerator and the riser having an inlet in downstream communication with the regenerator conduit. An embodiment of the invention is one, any or all of prior embodiments in this paragraph up through the tenth embodiment in this paragraph wherein the regenerator conduit is connected to the FCC riser. An embodiment of the invention is one, any or all of prior embodiments in this paragraph up through the tenth embodiment in this paragraph further comprising a disengaging chamber containing the riser outlet, the recycle conduit and the regenerator conduit in downstream communication with the disengaging chamber. An embodiment of the invention is one, any or all of prior embodiments in this paragraph up through the tenth embodiment in this paragraph wherein the recycle conduit bypasses the regenerator. An embodiment of the invention is one, any or all of prior embodiments in this paragraph up through the tenth embodiment in this paragraph further comprising a recycle line in downstream communication with the FCC reactor and the hydroprocessing unit is in downstream communication with the recycle line. An embodiment of the invention is one, any or all of prior embodiments in this paragraph up through the tenth embodiment in this paragraph further comprising a main fractionation column in downstream communication with the FCC reactor and the recycle line is in downstream communication with the main fractionation column. An embodiment of the invention is one, any or all of prior embodiments in this paragraph up through the tenth embodiment in this paragraph further comprising a vacuum separator in downstream communication with the main fractionation column and the recycle line is in downstream communication with the vacuum separator. An embodiment of the invention is one, any or all of prior embodiments in this paragraph up through the tenth embodiment in this paragraph further comprising a prefractionation column in the hydroprocessing separation section comprising a side outlet for a diesel stream and a bottom outlet, the FCC reactor in downstream communication with the bottom outlet.

An eleventh embodiment of the invention is an apparatus for catalytically cracking hydrocarbons comprising a hydroprocessing unit to hydroprocess a hydrocarbon feed stream to provide a hydroprocessed effluent stream; a hydroprocessing separation section in downstream communication with the hydroprocessing unit for separating hydroprocessed products to provide an FCC feed stream; FCC reactor in downstream communication with the hydroprocessing separation section for contacting the FCC feed stream with catalyst in a riser to catalytically crack the FCC feed stream to provide a cracked stream and spent catalyst; a disengaging chamber containing a riser outlet; a regenerator in downstream communication with the riser outlet for regenerating the spent catalyst; a recycle conduit in downstream communication with the disengaging chamber for recycling the spent catalyst to the FCC riser; An embodiment of the invention is one, any or all of prior embodiments in this paragraph up through the eleventh embodiment in this paragraph further comprising a riser inlet in downstream communication with the recycle conduit. An embodiment of the invention is one, any or all of prior embodiments in this paragraph up through the eleventh embodiment in this paragraph wherein the recycle conduit is connected to the FCC riser. An embodiment of the invention is one, any or all of prior embodiments in this paragraph up through the eleventh embodiment in this paragraph further comprising a regenerator conduit in downstream communication with the regenerator and the riser having an inlet in downstream communication with the regenerator conduit. An embodiment of the invention is one, any or all of prior embodiments in this paragraph up through the eleventh embodiment in this paragraph wherein the regenerator conduit is connected to the FCC riser. An embodiment of the invention is one, any or all of prior embodiments in this paragraph up through the eleventh embodiment in this paragraph wherein the regenerator conduit is in downstream communication with the disengaging chamber.

A twelfth embodiment of the invention is an apparatus for catalytically cracking hydrocarbons comprising a hydroprocessing unit to hydroprocess a hydrocarbon feed stream to provide a hydroprocessed effluent stream; a hydroprocessing separation section in downstream communication with the hydroprocessing unit for separating hydroprocessed products to provide an FCC feed stream; FCC reactor in downstream communication with the hydroprocessing separation section for contacting the FCC feed stream with catalyst in a riser to catalytically crack the FCC feed stream to provide a cracked stream and spent catalyst; a regenerator in downstream communication with the riser outlet for regenerating the spent catalyst; and a recycle conduit in downstream communication with the riser outlet for recycling the spent catalyst to the FCC riser; and a recycle line in downstream communication with the FCC reactor and the hydroprocessing unit is in downstream communication with the recycle line. An embodiment of the invention is one, any or all of prior embodiments in this paragraph up through the twelfth embodiment in this paragraph further comprising a vacuum separator in downstream communication with a main fractionation column in downstream communication with the FCC reactor and the recycle line is in downstream communication with the vacuum separator. An embodiment of the invention is one, any or all of prior embodiments in this paragraph up through the twelfth embodiment in this paragraph further comprising a prefractionation column in the hydroprocessing separation section comprising a side outlet for a diesel stream and a bottom outlet, the FCC reactor in downstream communication with the bottom outlet.

A thirteenth embodiment of the invention is a process for catalytically cracking hydrocarbons comprising feeding a hydrocarbon feed stream to an FCC reactor and contacting the hydrocarbon feed stream with catalyst to catalytically crack the hydrocarbon feed stream to provide a cracked stream; disengaging the catalyst from the cracked stream; fractionating the cracked stream into products including a slurry oil stream from a bottom of a main fractionation column; heating the slurry oil stream; separating the heated slurry oil stream into a cycle oil stream and a heavy stream under vacuum pressure. An embodiment of the invention is one, any or all of prior embodiments in this paragraph up through the thirteenth embodiment in this paragraph further comprising heating the slurry oil stream to increase the temperature of the slurry oil stream by about 19° to about 31° C. An embodiment of the invention is one, any or all of prior embodiments in this paragraph up through the thirteenth embodiment in this paragraph further comprising heating the slurry oil stream by heat exchange with a hot oil stream. An embodiment of the invention is one, any or all of prior embodiments in this paragraph up through the thirteenth embodiment in this paragraph further comprising heating the hot oil stream in a fired heater or by electric heat. An embodiment of the invention is one, any or all of prior embodiments in this paragraph up through the thirteenth embodiment in this paragraph further comprising condensing a separator overhead stream from an overhead of the separator, separating the condensed overhead stream in a receiver and taking the cycle oil stream from a bottom of the receiver. An embodiment of the invention is one, any or all of prior embodiments in this paragraph up through the thirteenth embodiment in this paragraph further comprising pulling a vacuum on a receiver overhead stream from the receiver and feeding it to a drain drum. An embodiment of the invention is one, any or all of prior embodiments in this paragraph up through the thirteenth embodiment in this paragraph further comprising refluxing a portion of the cycle oil stream to the separator vessel. An embodiment of the invention is one, any or all of prior embodiments in this paragraph up through the thirteenth embodiment in this paragraph further comprising recycling a portion of the cycle oil stream to the FCC reactor. An embodiment of the invention is one, any or all of prior embodiments in this paragraph up through the thirteenth embodiment in this paragraph further comprising recycling the cycle oil stream to a hydroprocessing unit before recycling a portion of the cycle oil stream to the FCC reactor. An embodiment of the invention is one, any or all of prior embodiments in this paragraph up through the thirteenth embodiment in this paragraph further comprising hydroprocessing the hydrocarbon feed stream in a first hydroprocessing zone and recycling the cycle oil stream to a second hydroprocessing zone. An embodiment of the invention is one, any or all of prior embodiments in this paragraph up through the thirteenth embodiment in this paragraph further comprising fractionating a first hydroprocessing zone effluent and a second hydroprocessing zone effluent in a prefractionation column. An embodiment of the invention is one, any or all of prior embodiments in this paragraph up through the thirteenth embodiment in this paragraph further comprising fractionating the cracked stream into products including a HCO stream from the main fractionation column and recycling a portion of the HCO stream to the FCC reactor.

A fourteenth embodiment of the invention is a process for catalytically cracking hydrocarbons comprising hydroprocessing a hydrocarbon feed stream in a hydroprocessing unit; feeding the hydrocarbon feed stream to an FCC reactor and contacting the hydrocarbon feed stream with catalyst to catalytically crack the hydrocarbon feed stream to provide a cracked stream; disengaging the catalyst from the cracked stream; fractionating the cracked stream into products including a slurry oil stream from a bottom of a main fractionation column; heating the slurry oil stream; separating the heated slurry oil stream into a cycle oil stream and a heavy stream under vacuum pressure; and recycling the cycle oil stream to the hydroprocessing unit; and recycling a portion of the cycle oil stream to the FCC reactor. An embodiment of the invention is one, any or all of prior embodiments in this paragraph up through the fourteenth embodiment in this paragraph further comprising heating the slurry oil stream to increase the temperature of the slurry oil stream by about 19° to about 31° C. An embodiment of the invention is one, any or all of prior embodiments in this paragraph up through the fourteenth embodiment in this paragraph further comprising hydroprocessing the hydrocarbon feed stream in a first hydroprocessing zone and recycling the cycle oil stream to a second hydroprocessing zone. An embodiment of the invention is one, any or all of prior embodiments in this paragraph up through the fourteenth embodiment in this paragraph further comprising fractionating a first hydroprocessing zone effluent and a second hydroprocessing zone effluent in a prefractionation column. An embodiment of the invention is one, any or all of prior embodiments in this paragraph up through the fourteenth embodiment in this paragraph further comprising fractionating the cracked stream into products including a HCO stream from the main fractionation column and recycling a portion of the HCO stream to the FCC reactor.

A fifteenth embodiment of the invention is a process for catalytically cracking hydrocarbons comprising feeding a hydrocarbon feed stream to an FCC reactor and contacting the hydrocarbon feed stream with catalyst to catalytically crack the hydrocarbon feed stream to provide a cracked stream; disengaging the catalyst from the cracked stream; fractionating the cracked stream into products including a slurry oil stream from a bottom of a main fractionation column; heating the slurry oil stream to increase the temperature of the slurry oil stream by about 19° to about 31° C.; separating the heated slurry oil stream into a cycle oil stream and a heavy stream under vacuum pressure. An embodiment of the invention is one, any or all of prior embodiments in this paragraph up through the fifteenth embodiment in this paragraph further comprising heating the slurry oil stream to increase the temperature of the slurry oil stream by about 19° to about 31° C.

A sixteenth embodiment of the invention is an apparatus for catalytically cracking hydrocarbons comprising an FCC reactor for contacting a hydrocarbon feed stream with catalyst to provide a cracked stream; a main fractionation column in downstream communication with the FCC reactor for fractionating the cracked stream into products including a slurry oil stream; a slurry heater in downstream communication with a main outlet in a bottom of the main fractionation column for heating the slurry oil stream; a vacuum separator in downstream communication with the slurry heater for separating the heated slurry oil stream into a cycle oil stream and a heavy stream under vacuum pressure. An embodiment of the invention is one, any or all of prior embodiments in this paragraph up through the sixteenth embodiment in this paragraph wherein the slurry heater is a heat exchanger. An embodiment of the invention is one, any or all of prior embodiments in this paragraph up through the sixteenth embodiment in this paragraph further comprising a loop heater in communication with the slurry heater for heating a heat exchange fluid for the slurry heater. An embodiment of the invention is one, any or all of prior embodiments in this paragraph up through the sixteenth embodiment in this paragraph wherein the loop heater is a fired heater or an electric heater. An embodiment of the invention is one, any or all of prior embodiments in this paragraph up through the sixteenth embodiment in this paragraph wherein the slurry heater is a shell and tube heat exchanger and the tube is in communication with the bottom outlet. An embodiment of the invention is one, any or all of prior embodiments in this paragraph up through the sixteenth embodiment in this paragraph further comprising a receiver in communication with a separator overhead line of the vacuum separator; a vacuum generation device in communication with a receiver overhead line of the receiver; and a receiver bottoms line of the receiver for providing a recycle stream. An embodiment of the invention is one, any or all of prior embodiments in this paragraph up through the sixteenth embodiment in this paragraph wherein the FCC reactor is in downstream communication with the receiver bottoms line. An embodiment of the invention is one, any or all of prior embodiments in this paragraph up through the sixteenth embodiment in this paragraph wherein a hydroprocessing unit is in downstream communication with the receiver bottoms line. An embodiment of the invention is one, any or all of prior embodiments in this paragraph up through the sixteenth embodiment in this paragraph wherein the FCC reactor is in downstream communication with the hydroprocessing unit. An embodiment of the invention is one, any or all of prior embodiments in this paragraph up through the sixteenth embodiment in this paragraph wherein the vacuum separator is a vacuum fractionation column.

A seventeenth embodiment of the invention is an apparatus for catalytically cracking hydrocarbons comprising an FCC reactor for contacting a hydrocarbon feed stream with catalyst to provide a cracked stream; a main fractionation column in downstream communication with the FCC reactor for fractionating the cracked stream into products including a slurry oil stream; a slurry heater comprising a heat exchanger in downstream communication with a main outlet in a bottom of the main fractionation column for heating the slurry oil stream; a vacuum separator in downstream communication with the slurry heater for separating the heated slurry oil stream into a cycle oil stream and a heavy stream under vacuum pressure; and a loop heater in communication with the slurry heater for heating a heat exchange fluid for the slurry heater. An embodiment of the invention is one, any or all of prior embodiments in this paragraph up through the seventeenth embodiment in this paragraph wherein the loop heater is a fired heater or an electric heater. An embodiment of the invention is one, any or all of prior embodiments in this paragraph up through the seventeenth embodiment in this paragraph wherein the slurry is a shell and tube heat exchanger and the tube is in communication with the bottom outlet. An embodiment of the invention is one, any or all of prior embodiments in this paragraph up through the seventeenth embodiment in this paragraph further comprising a receiver in communication with a separator overhead line of the vacuum separator; a vacuum generation device in communication with a receiver overhead line of the receiver; and a receiver bottoms line of the receiver for providing a recycle stream. An embodiment of the invention is one, any or all of prior embodiments in this paragraph up through the seventeenth embodiment in this paragraph wherein the FCC reactor is in downstream communication with the receiver bottoms line. An embodiment of the invention is one, any or all of prior embodiments in this paragraph up through the seventeenth embodiment in this paragraph wherein a hydroprocessing unit is in downstream communication with the receiver bottoms line. An embodiment of the invention is one, any or all of prior embodiments in this paragraph up through the seventeenth embodiment in this paragraph wherein the FCC reactor is in downstream communication with the hydroprocessing unit.

An eighteenth embodiment of the invention is an apparatus for catalytically cracking hydrocarbons comprising an FCC reactor for contacting a hydrocarbon feed stream with catalyst to provide a cracked stream; a main fractionation column in downstream communication with the FCC reactor for fractionating the cracked stream into products including a slurry oil stream; a slurry heater in downstream communication with a main outlet in a bottom of the main fractionation column for heating the slurry oil stream; a vacuum fractionation column in downstream communication with the slurry heater for separating the heated slurry oil stream into a cycle oil stream and a heavy stream under vacuum pressure; a receiver in communication with an overhead line of the vacuum fractionation column; a receiver bottoms line of the receiver for providing a recycle stream; and the FCC reactor in downstream communication with the receiver bottoms line. An embodiment of the invention is one, any or all of prior embodiments in this paragraph up through the eighteenth embodiment in this paragraph further comprising a hydroprocessing unit in downstream communication with the receiver bottoms line and the FCC reactor in downstream communication with the hydroprocessing unit. An embodiment of the invention is one, any or all of prior embodiments in this paragraph up through the eighteenth embodiment in this paragraph further comprising a vacuum generation device in communication with a receiver overhead line of the receiver.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. An apparatus for catalytically cracking hydrocarbons comprising:
   a hydroprocessing unit comprising a catalyst bed to hydroprocess a hydrocarbon feed stream to provide a hydroprocessed effluent stream;
   a hydroprocessing separation section in downstream communication with said hydroprocessing unit for separating hydroprocessed products to provide an FCC feed stream;

FCC reactor in downstream communication with said hydroprocessing separation section for contacting said FCC feed stream with catalyst in a riser to catalytically crack said FCC feed stream to provide a cracked stream and spent catalyst;

a regenerator in downstream communication with a riser outlet for regenerating said spent catalyst;

a recycle conduit in downstream communication with said riser outlet for recycling said spent catalyst to said FCC riser;

a main fractionation column in downstream communication with said FCC reactor; and said hydroprocessing unit being in downstream communication with said main fractionation column, wherein said hydroprocessing unit has a first hydroprocessing zone and a second hydroprocessing zone, and wherein said second hydroprocessing zone is in downstream communication with said main fractionation column and said main fractionation column is not in downstream communication with said first hydroprocessing zone.

2. The apparatus of claim 1 further comprising a riser inlet in downstream communication with said recycle conduit.

3. The apparatus of claim 2 wherein said recycle conduit is connected to said FCC riser.

4. The apparatus of claim 1 further comprising a regenerator conduit in downstream communication with said regenerator and said riser having an inlet in downstream communication with said regenerator conduit.

5. The apparatus of claim 4 wherein said regenerator conduit is connected to said FCC riser.

6. The apparatus of claim 4 further comprising a disengaging chamber containing said riser outlet, said recycle conduit and said regenerator conduit in downstream communication with said disengaging chamber.

7. The apparatus of claim 1 wherein said recycle conduit bypasses said regenerator.

8. The apparatus of claim 1 further comprising a vacuum separator in downstream communication with said main fractionation column and said second hydroprocessing zone in downstream communication with said vacuum separator.

9. The apparatus of claim 8 further comprising a prefractionation column in said hydroprocessing separation section comprising a side outlet for a diesel stream and a bottom outlet, said FCC reactor in downstream communication with said bottom outlet.

10. The apparatus of claim 1 wherein said second hydroprocessing zone comprises an aromatic saturation zone.

11. The apparatus of claim 1 further comprising a recycle line connecting a bottoms outlet in said main fractionation column with said second hydroprocessing zone.

12. The apparatus of claim 11 wherein said main fractionation column has a second outlet and wherein said recycle line further connects said second outlet with said second hydroprocessing zone.

13. An apparatus for catalytically cracking hydrocarbons comprising:

a hydroprocessing unit to hydroprocess a hydrocarbon feed stream to provide a hydroprocessed effluent stream;

a hydroprocessing separation section in downstream communication with said hydroprocessing unit for separating hydroprocessed products to provide an FCC feed stream;

FCC reactor in downstream communication with said hydroprocessing separation section for contacting said FCC feed stream with catalyst in a riser to catalytically crack said FCC feed stream to provide a cracked stream and spent catalyst;

a disengaging chamber containing a riser outlet;

a regenerator in downstream communication with said riser outlet for regenerating said spent catalyst;

a recycle conduit in downstream communication with said disengaging chamber for recycling said spent catalyst to said FCC riser;

a main fractionation column in downstream communication with said FCC reactor; and said hydroprocessing unit having a first hydroprocessing zone and a second hydroprocessing zone, said second hydroprocessing zone being in downstream communication with said main fractionation column and said main fractionation column not being in downstream communication with said first hydroprocessing zone.

14. The apparatus of claim 13 further comprising a riser inlet in downstream communication with said recycle conduit.

15. The apparatus of claim 14 wherein said recycle conduit is connected to said FCC riser.

16. The apparatus of claim 13 further comprising a regenerator conduit in downstream communication with said regenerator and said riser having an inlet in downstream communication with said regenerator conduit.

17. The apparatus of claim 16 wherein said regenerator conduit is connected to said FCC riser.

18. The apparatus of claim 16 wherein said regenerator conduit is in downstream communication with said disengaging chamber.

19. The apparatus of claim 13 further comprising a recycle line connecting a bottoms outlet in said main fractionation column with said second hydroprocessing zone.

* * * * *